(12) United States Patent
Gierkink et al.

(10) Patent No.: US 9,299,078 B2
(45) Date of Patent: Mar. 29, 2016

(54) TARGETING MESSAGES

(75) Inventors: Robert W. Gierkink, Lexington, MA (US); Timothy J. Wright, Cambridge, MA (US); James B. Ray, III, Upton, MA (US); Douglas E. Gaeth, Newton, MA (US)

(73) Assignee: DATALOGIX, INC., Westminster, CO (US)

( * ) Notice: Subject to any disclaimer, the term of this patent is extended or adjusted under 35 U.S.C. 154(b) by 733 days.

(21) Appl. No.: 12/277,700

(22) Filed: Nov. 25, 2008

(65) Prior Publication Data

US 2009/0144201 A1 Jun. 4, 2009

Related U.S. Application Data

(60) Provisional application No. 61/004,836, filed on Nov. 30, 2007.

(51) Int. Cl.
| | |
|---|---|
| G06F 21/00 | (2013.01) |
| G06Q 30/02 | (2012.01) |
| G06Q 20/10 | (2012.01) |
| G06Q 20/38 | (2012.01) |
| G06Q 40/00 | (2012.01) |

(52) U.S. Cl.
CPC .............. *G06Q 30/02* (2013.01); *G06Q 20/102* (2013.01); *G06Q 20/382* (2013.01); *G06Q 30/0242* (2013.01); *G06Q 30/0246* (2013.01); *G06Q 30/0273* (2013.01); *G06Q 40/12* (2013.01)

(58) Field of Classification Search
CPC ...................................................... G06Q 30/02

USPC ....................................................... 705/14, 50
See application file for complete search history.

(56) References Cited

U.S. PATENT DOCUMENTS

| | | | |
|---|---|---|---|
| 6,055,573 A | 4/2000 | Gardenswartz et al. | |
| 6,307,958 B1 | 10/2001 | Deaton et al. | |
| 6,386,450 B1 | 5/2002 | Ogasawara | |
| 6,424,949 B1 | 7/2002 | Deaton et al. | |
| 6,484,146 B2 | 11/2002 | Day et al. | |
| 6,631,358 B1 | 10/2003 | Ogilvie | |
| 6,735,572 B2 | 5/2004 | Landesmann | |
| 6,925,441 B1 | 8/2005 | Jones, III et al. | |
| 7,024,374 B1 | 4/2006 | Day et al. | |
| 7,043,531 B1 | 5/2006 | Seibel et al. | |
| 7,158,943 B2 | 1/2007 | van der Riet | |
| 7,231,357 B1 | 6/2007 | Shanman et al. | |
| 7,233,913 B2 | 6/2007 | Scroggie et al. | |
| 2002/0046084 A1* | 4/2002 | Steele et al. ..................... 705/14 |
| 2002/0046105 A1 | 4/2002 | Gardenswartz et al. | |
| 2002/0111863 A1* | 8/2002 | Landesmann ................... 705/14 |
| 2002/0129011 A1* | 9/2002 | Julien ............................... 707/3 |

(Continued)

OTHER PUBLICATIONS

Office Action mailed Jun. 9, 2014 for U.S. Appl. No. 13/045,843.

(Continued)

*Primary Examiner* — Charles C Agwumezie
(74) *Attorney, Agent, or Firm* — Kilpatrick Townsend & Stockton LLP

(57) ABSTRACT

The invention generally relates to systems and methods for directing information to people and/or households likely to be receptive to the information. Systems and methods according to the invention can be used to target one or more marketing messages, such as various types of offers, to one or more consumers determined likely to be receptive to the message(s).

24 Claims, 9 Drawing Sheets

(56) References Cited

U.S. PATENT DOCUMENTS

| | | | |
|---|---|---|---|
| 2003/0163343 A1* | 8/2003 | Meiser et al. ............... | 705/1 |
| 2004/0083183 A1 | 4/2004 | Hardesty et al. | |
| 2005/0071252 A1 | 3/2005 | Henning et al. | |
| 2005/0119939 A1 | 6/2005 | Henning et al. | |
| 2007/0027921 A1* | 2/2007 | Alvarado et al. ......... | 707/104.1 |
| 2007/0112579 A1 | 5/2007 | Ratnakaran et al. | |
| 2007/0250390 A1* | 10/2007 | Lee et al. ................ | 705/14 |
| 2007/0260521 A1* | 11/2007 | Van Der Riet ............ | 705/14 |
| 2008/0082433 A1 | 4/2008 | Hodges et al. | |
| 2009/0012839 A1 | 1/2009 | Fusillo et al. | |
| 2009/0132368 A1 | 5/2009 | Cotter et al. | |
| 2010/0082439 A9* | 4/2010 | Patel et al. ............... | 705/14.72 |
| 2011/0161165 A1 | 6/2011 | Gierkink et al. | |

OTHER PUBLICATIONS

Office Action mailed Oct. 15, 2012 for U.S. Appl. No. 13/045,843.
International Search Report and Written Opinion for corresponding international application No. PCT/US08/84660, mailed Jan. 23, 2009, eight pages.
Office Action for U.S. Appl. No. 13/045,843, mailed Mar. 21, 2012.
Driving growth with a retail marketing database, Experian Information Solutions, Inc. (posted Jul. 2007), at http://www.experianmarketingservices.com/resources/RetailMarketingDatabase.pdf, (2 pages), (last visited Oct. 30, 2008).
Plow and Hearth optimizes list performance and improves profitability of catalog prospecting campaigns, Experian Information Solutions, Inc. (posted Apr. 2006), http://www.experianmarketingservices.com/resources/PlowHearthCaseStudy.pdf, (2 pages), (last visited Oct. 30, 2008).
Specialty retailer gains access to actionable customer information through Experian's Totalvue$^{SM}$ Retail, Experian Information Solutions, Inc. (posted Oct. 2007), at http://www.experianmarketingservices.com/resources/TotalvueCaseStudy.pdf, (2 pages), (last visited Oct. 30, 2008).
Abacus, a division of Epsilon, Epsilon Data Management, LLC. (2008) at http://www.epsilon.com/epsilonstatic/services/solutions/abacus, (3 pages), (last visited Oct. 8, 2008).
"CoolSavings and Alliant Cooperative Data Solutions Launch First-of-its Kind 'Soft Offer Scoring' Lead Generation Solution," CoolSavings, Inc. (posted Jan. 25, 2005), available at http://findarticles.com/p/articles/mi_m0EIN/is_/ai_n8708228, (2 pages), (last visited Oct. 8, 2008).
Case Study: Potpourri Group, Wiland Direct Finds Incremental Names for Potpourri Group, Wiland Direct, at http://wilanddirect.com/CaseStudies/Potpourri.html, (1 page), (last visited Oct. 8, 2008).
Case Study: Lady Grace, Wiland Direct Delivers Superior Performance at Lower Cost, Wiland Direct, at http://www.wilanddirect.com/CaseStudies/LadyGrace.html, (1 page), (last visited Oct. 8, 2008).
Case Study: Aerosoles, Wiland Direct Produces Outstanding Results for Aerosoles, Wiland Direct, at http://www.wilanddirect.com/CaseStudies/Aerosoles.html, (1 page), (last visited Oct. 8, 2008).
About us, Experian® Marketing Services, at http://www.experianmarketingsolutions.com/aboutus.php, (3 pages), (last visited Oct. 8, 2008).
i-Behavior, at http://www.i-behavior.com/?gclid=CPeXoYe1mJYCFQ0HgodMSLx5w, (1 page), (last visited Oct. 8, 2008.
Acquire and Retain Customers, Optimize and Enhance Marketing, NextAction Corporation™, at http://www.nextaction.net/, (2 pages), (last visited Oct. 8, 2008).
Best to You™ leverages new database to better understand customer buying behavior and drive sales upward, CMS Direct Corporation, at http://www.cmsdirect.com/Files/cms%20direct%20case%20study-best%20to%20you.pdf, (1 page) (last visited Oct. 30, 2008).
Design Toscano decreases list and co-op acquisition costs by 23% and improves customer request file results too!, CMS Direct Corporation, at http://www.cmsdirect.com/Files/cms%20direct%20case%20study-design%20toscano.pdf, (1 page) (last visited Oct. 30, 2008).
CMS Direct wins Paul Fredrick Information Outsourcing Consolidation Contract for Multi-Channel Marketing and List Processing, CMS Direct Corporation, at http://www.cmsdirect.com/Files/cms%20direct%20case%20study-paul%20fredrick1.pdf, (2 pages), (last visited Oct. 30, 2008).
Final Office Action mailed on Jan. 29, 2015 for U.S. Appl. No. 13/045,843, 23 pages.
Canadian Office Action mailed on Apr. 17, 2015 for CA Patent Application 2,706,857, 4 pages.

* cited by examiner

|  | Consumer Account? | General Contact Information for household | | Contact Information for household member 1 | | | Contact Information for household member 2 | | |
|---|---|---|---|---|---|---|---|---|---|
|  |  | Home Address | Home Telephone Number | Name | Mobile Telephone Number | E-mail Address | Name | Mobile Telephone Number | E-mail Address |
| Business Entity A | Yes (Loyalty card) | ✓ | ✓ | ✓ |  | ✓ |  |  |  |
| Business Entity B | Yes (Loyalty card) | ✓ |  |  |  |  | ✓ | ✓ | ✓ |
| Business Entity C | Yes (General Account) |  | ✓ |  | ✓ |  |  |  |  |
| Business Entity D | No |  |  |  |  |  |  |  |  |

| Date of Purchase | Business Entity | Purchase Category | Payment Identifier | Consumer Account Identifier |
|---|---|---|---|---|
| Purchase record 1 (household member 1) 2007-08-11 | Business Entity A | Groceries | Credit Card 1 | Loyalty Card for Business Entity A |
| Purchase record 2 (household member 1) 2007-08-14 | Business Entity C | Mobile Telephone Usage | Credit Card 1 | General account for Business Entity C |
| ... | ... | ... | ... | ... |
| Purchase record 10 (household member 1) 2007-09-05 | Business Entity A | Groceries | Credit Card 2 | Loyalty Card for Business Entity A |
| ... | ... | ... | ... | ... |
| Purchase record 20 (household member 2) 2007-09-29 | Business Entity B | Consumer Electronics | Credit Card 2 | Loyalty Card for Business Entity B |
| ... | ... | ... | ... | ... |

Fig. 4

(400, 402, 404, 406 label rows; Link 408, Link 410, Link 412)

| | Consumer Account? | General Contact Information for household | | Contact Information for household member 1 | | | Contact Information for household member 2 | | |
|---|---|---|---|---|---|---|---|---|---|
| | | Home Address | Home Telephone Number | Name | Mobile Telephone Number | E-mail Address | Name | Mobile Telephone Number | E-mail Address |
| Business Entity A | Yes (Loyalty card) | ✓ | ✓ | ✓ | | | | | |
| Business Entity B | Yes (Loyalty card) | | | | | ✓ | ✓ | ✓ | ✓ |
| Business Entity C | Yes (General Account) | ✓ | ✓ | | ✓ | | | | |
| Business Entity D | No | | | | | | | | |
| Combined Contact Information from all consumer accounts associated with household | | ✓ | ✓ | ✓ | ✓ | ✓ | ✓ | ✓ | ✓ |

TARGETING MESSAGES

CROSS-REFERENCE TO RELATED APPLICATION

This application claims the benefit of and priority to provisional U.S. patent application Ser. No. 61/004,836 which was filed on Nov. 30, 2007, and the entirety of the contents of that provisional patent application is incorporated by reference herein.

TECHNICAL FIELD

Some embodiments of the invention generally relate to identifying one or more people and/or households likely to be receptive to certain information, and directing specific information to the identified people and/or households.

BACKGROUND INFORMATION

Retailers and other merchants generally are driven to enhance sales, such as by expanding or solidifying their customer base. In this regard, merchants have implemented marketing campaigns to reach out to existing or potential customers. The design and execution of traditional marking campaigns can be rather time-consuming, however, and can divert limited resources of the merchants from other tasks. Moreover, traditional marketing campaigns sometimes are unsuccessful in achieving their objectives, particularly when viewed against the amount of time and other resources devoted to these marketing campaigns. While this lack of success results from a number of factors, the lack of targeting of marketing or other promotional messages is at least sometimes a key factor. In particular, traditional marketing campaigns often involve sending a standardized promotional message to a large group of consumers, such as via mass mailing. Different consumers can have widely varying preferences and purchasing habits and, therefore, many consumers receiving this standardized promotional message may not be receptive to its contents.

SUMMARY OF THE INVENTION

Providers of all types of goods and services want to get offers and other types of marketing messages to the people most likely to receive that information favorably. These providers can include, for example, retailers (whether on-line or not or both), local advertisers, national brand advertisers, advertising and marketing agencies, media buying agencies, media companies (including television and Internet), telecommunications companies, financial service providers and various other service companies, business-to-business marketing companies, etc. Regardless of the particular type of provider, the ultimate goal is to cause one or more of the people receiving the message to act on it. The desired action could be a recipient of a discount coupon going to a retailer and using the coupon for some type of discount on the purchase of a particular item identified by the coupon. Or perhaps a recipient of an offer to buy or test drive a specific brand or model of automobile might act by visiting an automobile dealer and identifying the offer. These are just some examples of desired actions by the people targeted with the information.

In general, goods and services providers want to spend money on marketing efforts wisely and direct or target their offers and other types of marketing messages to people likely to act on the messages. It can be very inexpensive to send an offer electronically by email, but the return can be very low if most of the recipients do not fit the profile of a person likely to act on the offer.

Another reason why existing means of distributing messages yield low returns for goods and service providers and other advertisers is that consumers pay increasingly less attention to certain messages such as direct sales telephone calls, direct mail, email, and television and radio advertising. For example, a consumer may throw envelopes in the trash without even opening them, hang up on telephone sales representatives, use spam blocking or filters on their email account to route certain promotion emails to the email trash or to be deleted directly, and even use PVR (Personal Video Recorders such as TiVo™) to skip ads on television. One reason consumers do this is because they find most if not all such messages uninteresting and/or irrelevant.

One object of the invention is to provide methods and systems that allow providers of goods and/or services and any advertiser or other entity to direct their offers and any other marketing messages to people that fit a given profile. Such people will find the messages interesting and relevant and thus will tend to act on the messages.

Another object of the invention is to facilitate targeted marketing without requiring consumers to provide directly any contact or profile information to a manufacturer or other provider or to any other entity involved in the targeted marketing efforts. Useful information about consumers is derived from typical transaction records generated when purchases are made at retailers (or other entities) using various types of consumer payment cards (for example, credit, debit, prepaid, and other types of payment cards) and perhaps also various types of store cards (for example, consumer loyalty or rewards program cards such as a supermarket chain's loyalty program card). This derived information can be supplemented at some point, such as with information that is provided directly by the consumers and/or with information obtained from one or more sources of consumer information such as free or fee-based consumer databases, printed consumer information, etc.

Another object of the invention is to facilitate targeted marketing through channels such as television and the internet which are not perceived to be as invasive as other channels such as direct mail, email, and direct telephone sales. With more complete contact information derived from such purchase records (whether or not supplemented), such information including typically email addresses and phone numbers, and possibly also with consumer purchase profiles also derived from such purchase records, a marketing message such as an offer can be sent to particular cable, satellite, and/or one or more other types of TV subscribers deemed to meet certain requirements of the offeror. The offer alternatively or also could be made to appear on one or more web pages visited by consumers meeting the offeror's requirements. These are just some of the ways in which the marketing message can be delivered electronically and in a targeted manner to specific individuals and/or households.

Embodiments of the invention generally will involve tracking and storing individuals' behavior in using one or more store cards and/or payment cards to purchase various goods and/or services and also generally will involve using that tracked and stored information to target offers to appropriate ones of the individuals and/or to the household of appropriate ones of the individuals. The tracked and stored purchase data is not used to target offers to individuals at the point of sale but rather the data preferably is used to target offers to identified individuals and/or households electronically, via for example cable television, World Wide Web (as someone is browsing the Internet/Web using a client-side web browser application such as Microsoft's Internet Explorer), cell phone or other mobile device, telephone, SMS text, email, and/or other digital media. The invention generally does not require or use any equipment at the point of sale. The invention generally involves matching purchase behavior to gathered contact data (e.g., email addresses, names, addresses, phone numbers, etc.) to facilitate the targeting of offers via some digital or electronic media.

In general, targeted offers or other messages are sent via some type of media such as the Internet or television. If sent using the Internet, any one or more of a variety of entities can be involved including, for example, an Internet Service Provider (ISP), a publisher, a network of publishers, an advertising network, or some other intermediary. If sent by television, any one or more of a variety of technologies can be involved including, for example, terrestrial digital TV, cable TV, broadband TV, satellite TV, etc. Regardless of the media used to send the targeted messages, each of the messages sent over the media can include any one or more of text, an image, video, and audio, for example. As just some examples, a message might describe the benefits of a product and/or a service, or it might be a branding message with no explicit mention of specific benefits, or it might include a specific call to action for the recipient. A message could refer to a specified time by which action is required, call for a certain response, identify a particular reward, etc.

The tracked and stored purchase data is obtained from and/or provided by the establishments where the individuals shop (physically at a store location or on-line over the Web, for example), and at least some of this data (such as, for example, the payment card numbers, name and address, or other Personally Identifiable Information) typically is encrypted for security reasons. Embodiments of systems and methods according to the invention are able to handle (e.g., receive, store, process, send out, etc.) such encrypted data, including decrypting and re-encrypting it as necessary using the same and/or some other encryption scheme(s).

In one embodiment, the invention relates to a system and corresponding method for receiving and processing (at one time or more likely on an ongoing basis periodically or aperiodically) numerous consumer transaction records in order to derive at least contact information for numerous consumers and populate one or more data storage facilities (such as one or more relational databases) with that derived information. The derived contact information can be supplemented with information available from public and/or private sources to create a collection of contact information that is as complete as possible at the individual consumer and/or consumer household level. In addition to consumer contact information, the records can be processed to derive purchasing habit or profile information which also is stored. Various entities such as consumer packaged goods manufacturers (and/or any other advertiser or entity) can then take advantage of the rich information stored in the one or more data stores of the system to target specific people and/or households with certain offers, with a high degree of confidence that the people and households targeted are likely to be receptive to the offers.

Other embodiments involve starting with a collection of existing consumer contact information. Consumer transaction records can be obtained and processed as described above and herein, and the existing consumer contact information can be made more complete and accurate by adding to it (and/or adding it to) the consumer contact information derived from the processed transaction records. Sources of collections of consumer contact information include entities such as NextAction Corporation (of Westminster, Colo.), I-Behavior Inc. (of Louisville, Colo.), aCerno (of New York, N.Y.), and other consumer data cooperatives.

In addition to being able to target messages to specific people and/or households, embodiments of systems and methods according to the invention can gather and analyze subsequent purchase behavior to determine effectiveness of the targeted messages. This "closed loop" approach makes available valuable information about the impact of targeted messages on the people and/or households targeted with the messages.

Consumer packaged goods companies (such as General Electric, Coca-Cola, and Proctor & Gamble) can benefit by being able to target messages to specific people and/or households, and also to obtain subsequently the valuable information about the effectiveness of their targeted messages. These companies can be charged fees for the ability to get their messages out to receptive individuals and/or households. Retail companies (such as Kroger, Stop & Shop, CVS, and The Home Depot) that submit transaction records into, or make such records available for, embodiments of systems and methods according to the invention can be rewarded by some type of payment from the entity controlling such systems/methods. The payments from the controlling entity to the retailers can be apportioned in such a way that recognizes each retailers individual contribution of purchase data, for example.

The database(s) of consumer contact information and purchase data/behavior built and maintained and added to periodically or aperiodically by the controlling entity (based on the transaction records and possibly other information provided by the submitting retailers or other companies) does not require direct consumer input, can include consumer purchase records numbering in the millions or more, and can be mined to determine information of all sorts valuable to message providers and to purchase record providers. For example, the controlling entity can provide message providers (such as consumer packaged goods companies, for example) with information about the effectiveness of their messages, and the controlling entity can provide purchase record providers (such as retail companies, for example) with more complete contact information of its patrons and also a new revenue source.

The controlling entity can provide to another entity (such as a message provider or a purchase record provider) access to its database(s) or certain content within its database(s) to allow the other entity to perform various types of analyses on some or all of the contents of the database(s). Typically, the controlling entity will not provide any or all of the consumer identifying information, thus requiring the other entity to use the controlling entity to actually get any desired messages out to specific consumers meeting a certain profile or other requirement(s) of interest to the other entity. The controlling entity can be Data Logix Inc., a corporation formed in 2007 under the laws of the state of Delaware.

In one aspect, the invention generally relates to a computerized method of targeting marketing messages to consumers. This method comprises analyzing purchase records and any associated contact information of consumers to determine more complete contact information for at least some of the consumers and also to determine purchase profile information for at least some of the consumers. At least some of the determined more complete contact information and at least some of the purchase profile information is used to identify which one or more of the consumers should be sent a certain marketing message, and the certain marketing message then is sent electronically to the identified one or more of the consumers. The message can be sent by email, for example, and the message can be an offer to purchase a product or service at a discount.

In another aspect, the invention generally relates to a computerized method of targeting marketing messages to consumers, and the method comprises analyzing purchase history records of consumers to determine which one or more of the consumers fit a particular purchase profile, accessing a data store including contact information for at least some of the consumers to identify contact information for at least one of the consumers that fits the particular purchase profile, and using at least some of the identified contact information to send a certain marketing message electronically to each of the consumers that fits the particular purchase profile. Again, the message can be sent by email, and the message can be an offer to purchase a product or service at a discount.

In yet another aspect, the invention generally relates to a method of obtaining more complete contact information for a consumer without requiring the consumer to provide that contact information directly to a single location or entity. The method comprises receiving two or more store card accounts where at least one of the accounts includes some contact information for the consumer that is not included in at least one other of the accounts. The method also comprises receiving records of at least some of the consumer's purchases where the purchase records include at least one use of each of the two or more accounts. Each purchase record includes a payment card used for that purchase. The purchase records are analyzed to associate two or more of the accounts with the consumer. All of the contact information included in the two or more associated accounts is stored, and more complete contact information for the consumer is thereby obtained. The obtained more complete contact information for the consumer can be stored in a central database, and the store card accounts and payment card can be encrypted.

In still another aspect, the invention generally relates to a computerized method of allocating money to business entities. The method includes the use of a system that receives contact information and purchase records for one or more consumer entities from one or more business entities and that also determines which one or more of the consumer entities fit a particular purchase profile based on one or more of the purchase records of the one or more consumer entities. The method also involves determining which of the one or more business entities provided at least a portion of the contact information for each of the consumer entities determined to fit the particular purchase profile. And, a certain amount of money is then allocated to each of the determined business entities, as compensation for providing the contact information and purchase records in the first place and also as an incentive to continue providing such information and records. The allocated amount of money for each business entity then can be paid out to each of the business entities, and information about the allocated amount of money for each business entity may be stored in a central database. The consumer entities can be individual consumers and may be one member of a larger consumer household or not.

In another aspect, the invention generally relates to a computerized method of determining the effectiveness of marketing messages to consumer entities. The method includes the use of a system for receiving contact information and purchase records of one or more consumer entities from one or more business entities, and for determining which one or more of the consumers fit a particular purchase profile based on their purchase records. The method also includes selecting a subset of consumer entities, as a control group, from among the one or more consumer entities that fit the particular purchase profile. After a marketing message is sent out to the one or more consumer entities, but not the members of the control group, subsequent purchase records of the consumer entities receiving the marketing message are compared with the purchase records of the control group members. The results from this comparison can indicate the effectiveness of the marketing message. The comparison can involve determining the percentage of consumer entities that responded to the marketing message, determining the percentage of control group members that acted in accordance with one of the consumer entities that responded to the marketing message, and storing the difference between the two percentages as a measure of the effectiveness of the marketing message.

Other aspects, objects, features, and advantages of the invention are described in the following sections or will become apparent from reviewing the following sections.

BRIEF DESCRIPTION OF THE DRAWINGS

The foregoing and other aspects, objects, features, and advantages of the invention, as well as the invention itself, will be more fully understood from the following description when read together with the accompanying drawings which primarily illustrate the principles of the invention and embodiments according to the invention. The drawings are not necessarily to scale. The drawings and the disclosed embodiments of the invention are exemplary only and not limiting on the invention.

FIG. 3 is an arrangement of contact information from multiple consumer accounts, according to an embodiment of the invention.

FIG. 4 is an arrangement of purchase records involving use of the multiple consumer accounts of FIG. 3, according to an embodiment of the invention.

FIG. 5 is an arrangement of combined contact information that is derived from the contact information of FIG. 3, according to an embodiment of the invention.

DESCRIPTION

Figure 1:
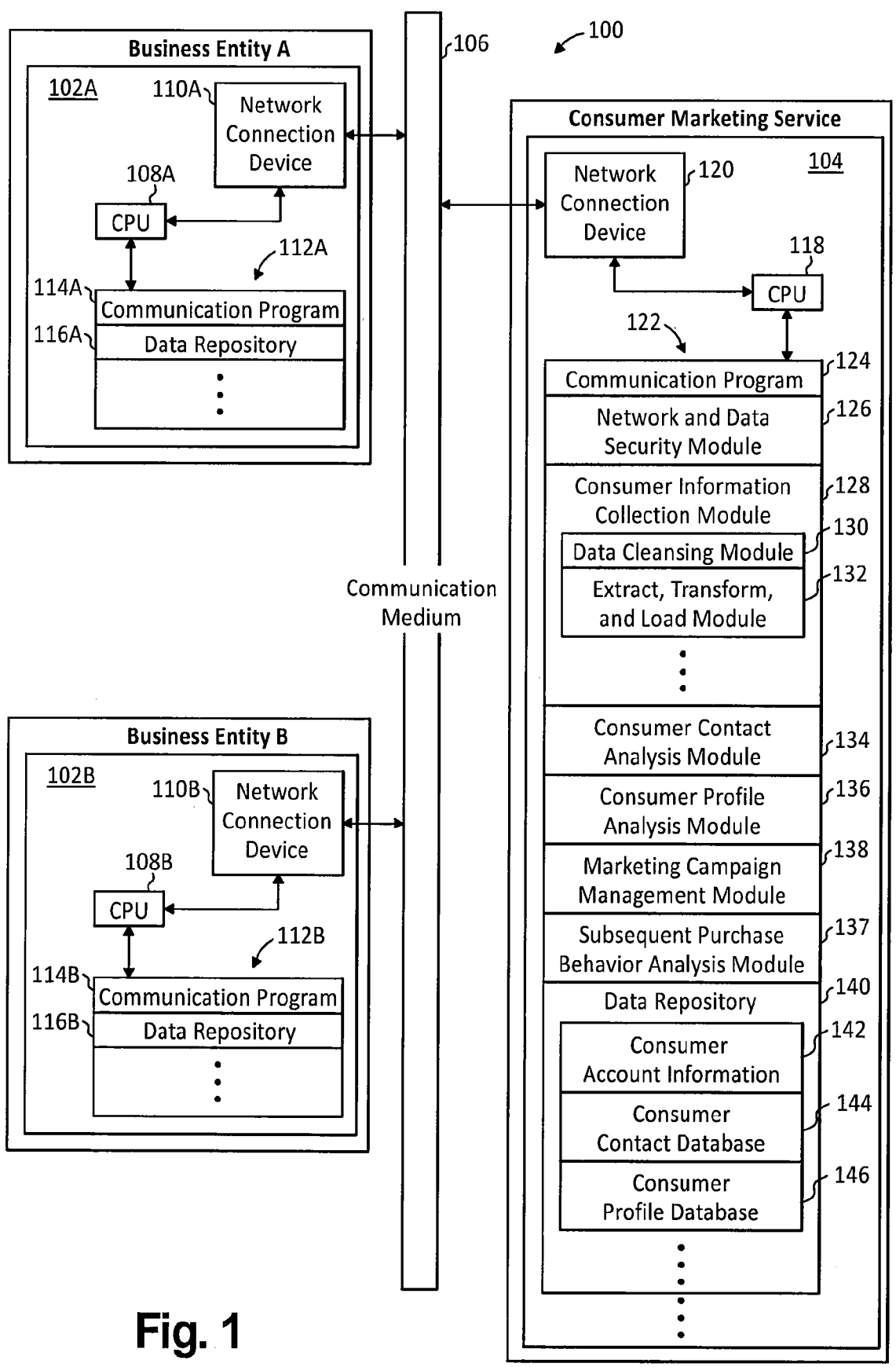
FIG. 1 is a block diagram of a computer system that is implemented in accordance with an embodiment of the invention.

FIG. 1 illustrates a computer system 100 that is implemented in accordance with an embodiment of the invention. In the illustrated embodiment, the computer system 100 includes multiple server computers, including server computers 102A, 102B, and 104. The server computers 102A, 102B, and 104 are connected via a communication medium 106, which can be any wired and/or wireless communication medium such as the Internet or other type of computer network. While three server computers are illustrated in FIG. 1, it is contemplated that the computer system 100 can include more or less server and/or other types of computers depending upon the particular implementation. Communication between the server computers 102A, 102B and 104 may be via physical or partly physical transmission of data such as transmitting data on CD's, or via FTP, and may be carried out instantaneously (in real time) or with some delay (for example using a storing and forward or queuing approach.)

As illustrated in FIG. 1, the server computers 102A and 102B are operated by business entity A and business entity B, respectively. For example, business entity A can be one provider of goods and services, such as a retailer of groceries, and business entity B can be another provider of goods and services, such as a retailer of consumer electronics. As part of its activities, business entity A maintains consumer accounts for certain consumers who have signed up for those accounts or who otherwise patronize business entity A. The consumer accounts can be, for example, loyalty or rewards program accounts or general accounts, and can be referred to as store card accounts. Each consumer can be a member of a consumer entity, such as a household, a family, a business entity, or any other relevant unit or grouping for marketing purposes. In some instances, a consumer entity can be an individual consumer. Similar to business entity A, business entity B maintains consumer or store card accounts for certain consumers who have signed up for those accounts or who otherwise patronize business entity B. A typical scenario involves business entity A possessing, in its consumer accounts, partial information about a particular consumer entity, such as general information about a particular household or information about one member of the household who patronizes business entity A. Business entity B may possess partial and potentially different information about that same consumer entity, such as information about another member of the household who patronizes business entity B. Accordingly, neither business entity A alone nor business entity B alone possesses complete information about that consumer entity.

Referring to FIG. 1, the server computer 102A includes a number of typical computer components for servers, clients, and general-purpose computers generally, including a Central Processing Unit ("CPU") 108A that is connected to a network connection or I/O (input/output) device 110A and memory 112A. The memory 112A stores one or more computer programs that can be executed by the CPU 108A, including a communication program 114A which operates to establish conventional network communications with the computer 104 via the network connection device 110A. As illustrated in FIG. 1, the memory 112A also stores a data repository 116A, which organizes information related to activities of business entity A. In particular, the data repository 116A organizes information about the consumer accounts maintained by business entity A. The data repository 116A can be implemented as, for example, a relational database. The memory 112A can be one or more of any of a variety of computer-readable mediums including, for example, temporary storage devices such as RAM (random access memory) devices and/or permanent storage devices such as hard disk drives. The memory 112A in general is a computer-readable medium for storing and allowing access to data and/or executable instructions (also called computer programs, code, and software).

Like the computer 102A, the computer 102B also includes a CPU 108B that is connected to a network connection device 110B and memory 112B. The memory 112B stores a communication program 114B and a data repository 116B, which organizes information related to activities of business entity B. In particular, the data repository 116B organizes information about the consumer accounts maintained by business entity B. Various components of the server computer 102B can be implemented in a similar manner as described for the server computer 102A.

As illustrated in FIG. 1, the server computer 104 is operated as a consumer marketing service to facilitate the design and execution of targeted marketing campaigns. Advantageously, the consumer marketing service facilitates the generation of marketing opportunities by providing a higher level of insight into which consumers are likely to be receptive to certain types of marketing or promotional messages. This higher level of insight is provided by collecting and analyzing information from multiple consumer accounts maintained by multiple business entities including at least two business entities such as business entity A and business entity B. By operating in such manner, the consumer marketing service is able to derive useful information about a particular consumer entity that is more complete than otherwise available to a single business entity.

Similar to the server computers 102A and 102B, the server computer 104 includes a CPU 118 that is connected to a network connection device 120 and memory 122. The memory 122 stores a number of computer programs, including a communication program 124. Various components of the server computer 104 can be implemented in the same or a similar manner as described for the server computers 102A and 102B. While not shown, each of the computers 102A, 102B, and 104, as well as any other computer used in connection with any embodiment disclosed herein, typically includes one or more display devices for a user of the computer to employ to interact and interface with the computer. The display(s) is/are part of or connected to the computer and typically located local to the computer but additionally or alternatively could be remote from the computer. Flat screen and cathode ray tube (CRT) monitors are just two types of display devices that a user of the computer can utilize to view words and/or images and otherwise interface with the computer.

In the illustrated embodiment, the memory 122 also stores a set of computer programs that implement the processing operations described herein. For example, the memory 122 can store a network and data security module 126, a consumer information collection module 128, a consumer contact analysis module 134, a consumer profile analysis module 136, and a marketing campaign management module 138. The computer programs 126, 128, 134, 136, and 138 operate in conjunction with a data repository 140, which organizes information related to the design and execution of targeted marketing campaigns. The data repository 140 can be implemented as, for example, one or more relational databases.

Referring to FIG. 1, the network and data security module 126 performs various security functions with respect to potentially sensitive information of consumer entities. In particular, the network and data security module 126 controls access to the information stored in the data repository 140. Access to the information can be selectively provided to particular business entities, such as business entity A, business entity B, and advertising or media entities that are affiliated with these business entities. In addition, the network and data security module 126 encrypts certain information for transmission across the communication medium 106, such as by using public-key cryptography, digital certificates, or secure file transfer protocols. The network and data security module 126 can perform encryption, decryption, and re-encryption functions to protect some or all of the information stored in the data repository 140 and some or all of the data that goes into and out of the data repository 140.

As illustrated in FIG. 1, the consumer information collection module 128 collects information from multiple consumer accounts maintained by multiple business entities. In the illustrative embodiment, the consumer information collection module 128 collects information from the consumer accounts maintained by business entity A and information from the consumer accounts maintained by business entity B. The information that is collected from each consumer account can include contact information as well as at least some purchase records associated with that account. For example, the consumer information collection module 128 can collect information about one member of a household from one consumer account maintained by business entity A, and the consumer information collection module 128 can collect information about another member of the household from a different consumer account maintained by business entity B. Alternatively or additionally, the module 128 can collect certain information about a member of a household from business entity A and also can collect other information about that same household member from business entity B. By operating in such manner, the consumer information collection module 128 can collect partial information about a consumer entity from one consumer account and partial and potentially different information about that same consumer entity from a different consumer account. Once collected, the information is stored in the data repository 140 as consumer account information 142.

In the illustrated embodiment, the consumer information collection module 128 includes a data cleansing module 130 and an Extract, Transform, and Load ("ETL") module 132. The data cleansing module 130 and the ETL module 132 perform various data management functions with respect to the information that is collected and stored in the data repository 140. In particular, the data cleansing module 130 performs functions such as data cleansing, validity and consistency checking, and name and address standardization, while the ETL module 132 performs functions such as data extraction, data transformation, and updating of the data repository 140.

Still referring to FIG. 1, the consumer contact analysis module 134 analyzes the consumer account information 142 to derive combined contact information for various consumer entities. In particular, the consumer contact analysis module 134 analyzes purchase records collected from business entity A and purchase records collected from business entity B to identify links between those purchase records. The purchase records can involve use of multiple consumer accounts by various members of a consumer entity, and each of the consumer accounts can include partial and potentially different contact information for that consumer entity. For example, certain purchase records can involve use of one consumer account that includes contact information for one member of a household, while other purchase records can involve use of a different consumer account that includes contact information for another member of the household. By operating in such manner, the consumer contact analysis module 134 can aggregate partial contact information for a consumer entity to derive combined, and more complete, contact information for that consumer entity. Once derived, the combined contact information is stored in the data repository 140 within a consumer contact database 144.

The combined contact information can be supplemented at some point, if desired, with information available from public and/or private sources to create a stored collection of contact information that is even more complete at the individual consumer and/or consumer household level, if any desired contact information is missing after the combined contact information is derived. This supplemental contact information can be obtained from, for example, one or more sources of consumer information such as free or fee-based consumer databases, printed consumer information, etc.

In the illustrated embodiment, the consumer profile analysis module 136 analyzes the consumer account information 142 to derive consumer profiles for various consumer entities. In particular, the consumer profile analysis module 136 analyzes purchase records of a particular consumer entity to identify purchasing habits or trends of that consumer entity. Purchase records can be selected as those linked with respect to a particular consumer entity and those satisfying certain criteria related to the design and execution of a targeted marketing campaign. The purchase records can involve use of multiple consumer accounts by various members of the consumer entity, and each of the consumer accounts can include partial and potentially different purchasing information for that consumer entity. For example, certain purchase records can involve purchases made by one member of a household using one consumer account, while other purchase records can involve purchases made by another member of the household using a different consumer account. By operating in such a manner, the consumer profile analysis module 136 can aggregate partial purchasing information for a consumer entity to derive a consumer profile for that consumer entity. Once derived, the consumer profile is stored in the data repository 140 within a consumer profile database 146.

In one embodiment, the profile includes the identity of one or more specific products and/or services a consumer entity bought, the date of the purchase(s), the retailer(s) from which the purchase(s) was made, the form of payment used for the purchase(s), and/or other such details about the purchase(s) by the consumer entity. A profile could be referred to as a purchase profile, and a particular profile might indicate that a particular consumer purchased one or more products in a certain category of product(s). For example, "child care products" might be a category of products, and with "child care products" as a category of purchased products within a particular consumer's profile, that consumer might be considered a good candidate for an advertisement about the same and/or one or more other child care products. If a consumer entity's profile includes information about the ages of the members of the entity, their incomes or income ranges, and/or other such personal information, that information could be used (alone or with other identifying information obtained from a third party, for example) to identify the consumer entity as appropriate or not for certain advertisements or offers. A profile might include one or more applicable category descriptors, such "young mother" or "empty nester" or maybe "child care product buyer" or "buyer of automotive products", or such descriptors might be derived or derivable from the product and/or service purchase details included in the profile. These are just some details about and examples of a profile.

Still referring to FIG. 1, the marketing campaign management module 138 facilitates the design and execution of targeted marketing campaigns. In particular, the marketing campaign management module 138 exploits the information stored in the data repository 140 to target promotional messages at appropriate consumer entities, thereby promoting improved sales as well as improved consumer satisfaction and loyalty. Using combined contact information of various consumer entities, promotional messages can be delivered, preferably via one or more electronic delivery channels such as via telephone, electronic mail ("e-mail" or "email"), cable television, and the Internet, and/or by less preferable non-electronic, more conventional methods such as postal mail.

The electronic delivery can involve, for example, sending a message to specific TV service (for example, cable, satellite, and/or one or more other types of TV services) subscribers using their in-home set-top boxes and the cable operator's infrastructure and network to make the delivery, and/or sending a message to the computers of specific consumers as they browse the web (with or without the help of one or more Internet Service Providers), all made possible by having collected more complete contact information about individual consumers and/or consumer households including, for example, names, addresses, phone numbers, and email addresses and using at least some of that information to effectuate the electronic delivery. In addition, the marketing campaign management module 138 can define and maintain targeted consumer segments including appropriate consumer entities, coordinate the delivery of promotional messages to the targeted consumer segments, and evaluate the effectiveness of the promotional messages and an overall marketing campaign.

Still referring to FIG. 1, a subsequent purchase behavior analysis module 137 analyzes the effectiveness of targeted marketing or advertising campaigns. In particular, the purchase behavior analysis module 137 tracks and analyzes the purchase records of the consumer entities that receive a particular targeted message after the message is sent out to those entities. Analyzing subsequent purchase records allows a business entity to determine which of the recipients of the message responded to it. For example, a producer of consumer packaged goods can determine the effectiveness of a targeted message or marketing campaign by getting feedback from a system and/or method according to the invention that analyzespurchase behavior subsequent to the message being sent out. A company that makes toothpaste can be provided with information about the effectiveness of targeted discount coupons sent out using a targeted messaging system and/or method according to the invention.

Such tracking and analyzing regarding which consumers respond to which advertising messages has several benefits. One such benefit is that a producer of, for example, consumer packaged goods can be provided with information that indicates the effectiveness of such things as a particular advertising message, an entire larger advertising campaign, and/or the targeted recipients responses. In a disclosed embodiment, a system and/or method is made available to a producer that allows a targeted advertisement of the producer to be sent to certain consumers and that allows the producer to receive back information about the subsequent purchase behavior of those consumers and thus the effectiveness of any targeted message. The subsequent purchase behavior analysis module 137 can perform the functions necessary to create and send out the information about the effectiveness of any targeted message. This sort of information allows the producer to discern whether, among other things, its targeted messages are actually going to the correct or appropriate group of consumer entities.

By tracking and analyzing which contact and purchase data is sourced from which providers of data (business entities A and B being two examples of data providers), several benefits are realized. One such benefit is that a business entity which provides consumer purchase and contact information can be paid a share of the associated revenue collected by the controlling entity when a particular consumer is profiled or segmented or targeted with a specific advertisement based at least to some extent on that data. The money allocated to and/or received by the providing business entity does not need to be the money collected by the controlling entity. It could be money received from advertisers or other entities that pay the controlling entity for getting the advertisers' message(s) out to specific consumers identified as meeting a certain profile, and in a disclosed embodiment according to the invention it is such collected revenue, but it does not need to be. Some amount of money, in any event, is allocated to a business entity when it is determined that the business entity provided information about a consumer that met the certain profile, and in general the more a providing business entity's provided-information gets used to target messages to profile-meeting consumers the more money that business entity will earn and be paid. In one embodiment, the computer system 100 may apportion a percentage of revenue collected for the provision of targeted advertisement to a group of consumers (by whatever entity is running the targeted messaging system and/or method) to the retailers responsible for providing the contact and purchase information which enabled those consumers to be segmented and targeted. For example, if the contact information for consumer C is aggregated from data gathered from business entities B1 and B2 and business entity B1 is responsible for providing 80% of consumer C's aggregated contact information and business entity B2 is responsible for the remaining 20%, and if consumer C receives advertising message A, a portion of the revenue derived from getting message A out to consumer C (or a portion of some amount of money regardless of where the money came from) can be allocated to business entities B1 and B2 relative to the amount of contact information for consumer C that each of B1 and B2 provided. In one example, business entity B1 would be paid 80% and business entity B2 would be paid 20% of whatever portion of revenue or other money is made available to these and/or other business entities by the entity running the targeted messaging system and/or method.

Another benefit of tracking and analyzing which contact and purchase data is sourced from which providers of data is that a business entity which provides consumer purchase and contact information can receive a share of the associated revenue collected by the controlling entity when a particular consumer's purchase behavior is analyzed to measure the effectiveness of a targeted advertising campaign. In one embodiment, the computer system 100 may apportion a percentage of revenue collected for the measurement of a targeted advertising campaign to a group of consumers (by whatever entity is running the targeted messaging system and/or method) to the retailers responsible for providing the contact and purchase information which enabled those consumers' purchase behavior before, during, and after the campaign to be analyzed for the purposes of determining campaign effectiveness. For example, if the contact and purchase information for consumer C is aggregated from data gathered from business entities B1 and B2 and business entity B1 is responsible for providing 80% of consumer C's contact and purchase information and business entity B2 is responsible for the remaining 20%, some money can be allocated to business entities B1 and B2 relative to the amount of contact and purchase information for consumer C that each of B1 and B2 provided. In one example, business entity B1 would receive 80% and business entity B2 would receive 20% of whatever portion of revenue or other money is made available to these and/or other business entities.

It should be recognized that the computer programs illustrated in the memory 122 are provided by way of example. The processing operations described with reference to the computer programs can be implemented in any of a number of ways. In addition, it should be recognized that the processing operations need not be implemented on the single server computer 104. In particular, it is contemplated that the processing operations can be implemented across multiple server computers, multiple client computers, some combination of multiple client and server computers, and so forth. In addition, some portion of processing operations may be carried out by third party data processors, for example where consumer credit history is required, or where up to date name and address data or demographic data is sourced from third party providers.

The foregoing provides a general overview of an embodiment of the invention. Attention next turns to FIG. 2, which illustrates processing operations that are carried out in accordance with an embodiment of the invention. For ease of presentation, the processing operations are described with respect to a particular consumer entity, whether it be an individual or a household comprising two or more individuals. However, it should be recognized that similar processing operations can be carried out for additional consumer entities in a concurrent or sequential manner.

Figure 2:
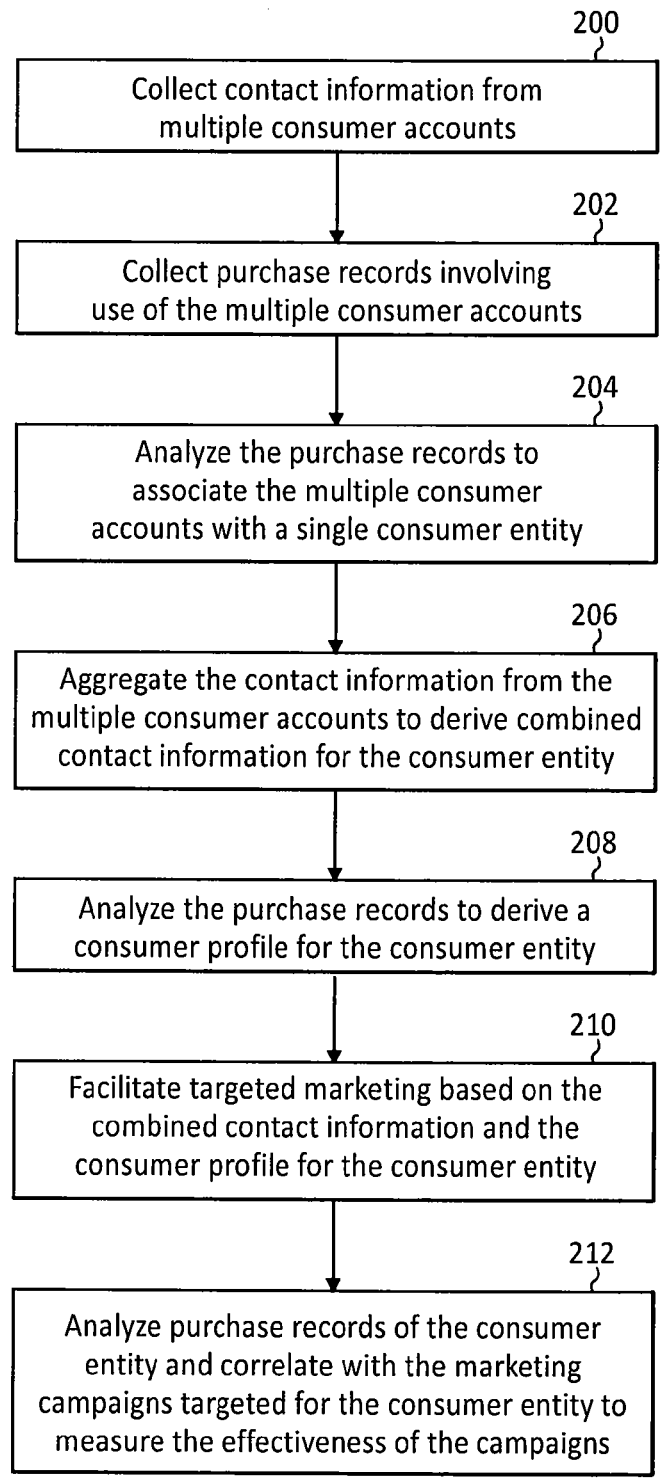
FIG. 2 is a flowchart of processing operations that are carried out in accordance with an embodiment of the invention.

The first processing operation illustrated in FIG. 2 is to collect contact information from multiple consumer accounts (block 200). In the illustrated embodiment, a consumer information collection module (e.g., the consumer information collection module 128) collects the contact information from multiple consumer accounts that are maintained by participating business entities. Collection of the contact information can be performed at one time or on an ongoing basis, such as in accordance with a particular event schedule or a particular time schedule. For example, collection of the contact information can be performed in a periodic or non-periodic manner to account for potential updates.

FIG. 3 illustrates an arrangement of contact information collected from multiple consumer accounts, according to an embodiment of the invention. In the illustrated embodiment, contact information from each consumer account is arranged as a row of data within a table including a number of fields, and a check mark serves as a shorthand to indicate the availability of contact information under a particular field. The fields correspond to various types of contact information, including general contact information for a household and contact information for a particular member of the household. For ease of presentation, all rows illustrated in FIG. 3 are related to a single household that includes two members, namely household member 1 and household member 2. As reflected in row 300, household member 1 has a loyalty card account at business entity A, and this account includes general contact information for the household and some contact information for household member 1. As reflected in row 302, household member 2 has a different loyalty card account at business entity B, and this account includes contact information for household member 2. And, as reflected in row 304, household member 1 has a general account at business entity C, and this account includes general contact information for the household and some contact information for household member 1. Neither household member 1 nor household member 2 has a consumer account at business entity D, and, therefore, there are no check marks in row 306. As can be appreciated with reference to FIG. 3, no single one of the business entities possesses complete contact information for the household. In addition, the business entities may be unaware that household member 1 and household member 2 are, in fact, members of the same household.

Referring back to FIG. 2, the second processing operation is to collect purchase records involving use of the multiple consumer accounts (block 202). In the illustrated embodiment, the consumer information collection module (e.g., the consumer information collection module 128) collects the purchase records from the multiple consumer accounts that are maintained by the participating business entities. Similar to collection of the contact information, collection of the purchase records can be performed at one time or on an ongoing basis, such as in accordance with a particular event schedule or a particular time schedule.

FIG. 4 illustrates an arrangement of purchase records collected from multiple consumer accounts, according to an embodiment of the invention. In the illustrated embodiment, the purchase records are arranged chronologically as respective rows of data within a table including a number of fields. The fields correspond to various types of purchasing information, including a date of a purchase, a business entity involved in that purchase, a goods or services category of that purchase (or aggregated purchase item level data), a method of payment used for that purchase, and a consumer account used for that purchase. For ease of presentation, all rows illustrated in FIG. 4 are related to the same household previously described in connection with FIG. 3. As reflected in row 400 of FIG. 4, household member 1 made a purchase of groceries at business entity A, and this purchase was made using credit card 1 and the loyalty card account at business entity A. As reflected in row 402, household member 1 next paid for mobile telephone services provided by business entity C, and this payment was made using credit card 1 and was credited to the general account at business entity C. As reflected in row 404, household member 1 next made another purchase of groceries at business entity A, and this purchase was made using credit card 2 and the loyalty card account at business entity A. And, as reflected in row 406, household member 2 next made a purchase of consumer electronics at business entity B, and this purchase was made using credit card 2 and the loyalty card account at business entity B. As can be appreciated with reference to FIG. 3, no single one of the business entities possesses complete purchasing information for the household.

Referring back to FIG. 2, the third processing operation is to analyze the purchase records involving use of the multiple consumer accounts to associate those accounts with a single consumer entity (block 204). In the illustrated embodiment, a consumer contact analysis module (e.g., the consumer contact analysis module 134) analyzes the purchase records that are collected from the multiple consumer accounts to identify links between those purchase records. By identifying the links, the multiple consumer accounts can be associated with one common consumer entity. Identification of the links can involve identifying common purchasing information across two or more of the purchase records, such as a common method of payment or a common consumer account. Other techniques can be used to associate multiple consumer accounts with one common consumer entity. For example, the consumer accounts can be linked by identifying common contact information across those accounts, such as a common home address or a common telephone number.

As illustrated in FIG. 4, various links 408, 410, and 412 between the purchase records are identified to associate those purchase records with one common household. In particular, the link 408 between rows 400 and 402 is identified based on the common use of credit card 1. The link 410 between rows 400 and 404 is identified based on the common use of the loyalty card account at business entity A. And, the link 412 between rows 404 and 406 is identified based on the common use of credit card 2. In such manner, the purchase records corresponding to rows 400, 402, 404, and 406 can be linked together, and the multiple consumer accounts used in connection with those purchase records can be associated with one common household.

Referring back to FIG. 2, the fourth processing operation is to aggregate the contact information from the multiple consumer accounts to derive combined contact information for the consumer entity (block 206). In the illustrated embodiment, once the multiple consumer accounts are associated with one common consumer entity, the consumer contact analysis module (e.g., the consumer contact analysis module 134) aggregates the contact information from those accounts to derive more complete contact information for that consumer entity. Aggregation of the contact information can involve identifying common contact information across the multiple consumer accounts, thereby avoiding the inclusion of duplicative information.

FIG. 5 illustrates an arrangement of combined contact information that is derived from multiple consumer accounts, according to an embodiment of the invention. In the illustrated embodiment, the combined contact information is derived from the consumer accounts previously described in connection with FIG. 3. For ease of presentation, various aspects of FIG. 3 are again illustrated in FIG. 5. Referring to FIG. 5, the consumer accounts maintained by business entity A, business entity B, and business entity C are associated with one common household, and the contact information from those accounts are aggregated to derive the combined contact information for the household, which is arranged as row 500. Advantageously, the combined contact information is more complete than otherwise available to any single business entity, and includes general contact information for the household, contact information for household member 1, and contact information for household member 2. Indeed, business entity D initially did not possess any contact information for the household, but now has access to the combined contact information.

Referring back to FIG. 2, the fifth processing operation is to analyze the purchase records from the multiple consumer accounts to derive a consumer profile for the consumer entity (block 208). In the illustrated embodiment, once the multiple consumer accounts are associated with one common consumer entity, a consumer profile analysis module (e.g., the consumer profile analysis module 136) analyzes the purchase records from those accounts to derive more complete purchasing information for that consumer entity. Analysis of the purchase records can involve aggregating the purchase records to derive combined purchase records as well as identifying purchasing habits or trends from the combined purchase records. Analysis of the purchase records can also involve selecting a subset of the purchase records based on certain criteria specified for a targeted marketing campaign, such as criteria related to products or services that are the focus of the marketing campaign.

Still referring to FIG. 2, the sixth processing operation is to facilitate targeted marketing based on the combined contact information and the consumer profile for the consumer entity (block 210). In the illustrated embodiment, once the combined contact information and the consumer profile are derived for the consumer entity, a marketing campaign management module (e.g., the marketing campaign management module 138) exploits this information so that highly relevant promotional messages can be directed to that consumer entity via one or more delivery channels. It is contemplated that the marketing campaign management module can provide reports related to the design and execution of a targeted marketing campaign. It is also contemplated that the marketing campaign management module can provide a set of options to control various aspects of the processing operations described above.

Figure 6:
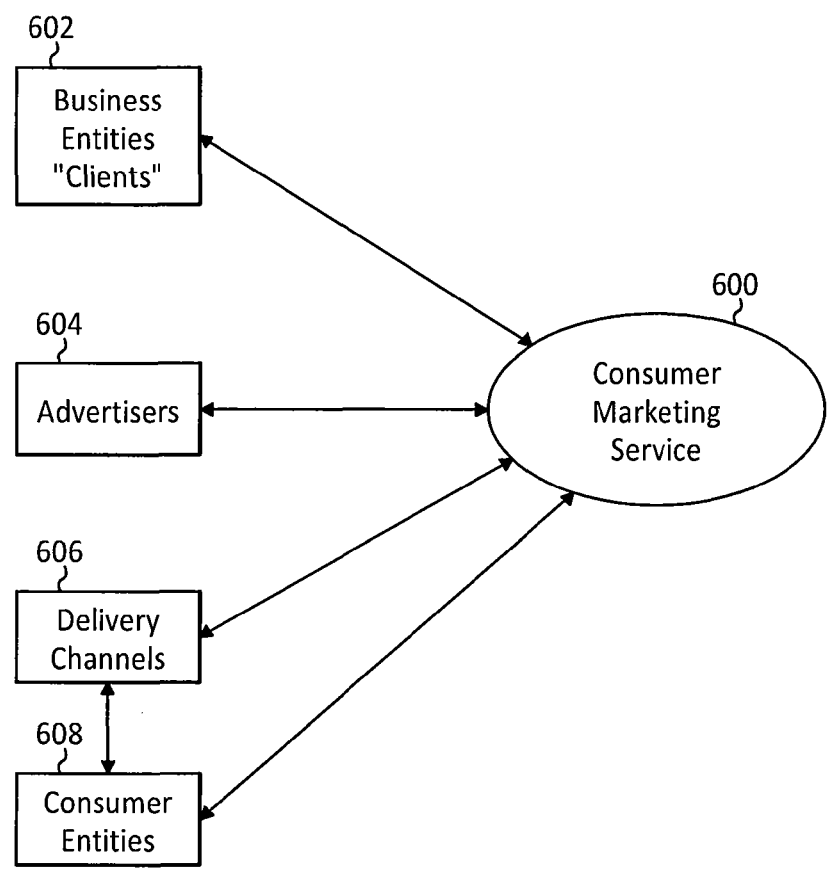
FIG. 6 is a block diagram of an operational scenario for a consumer marketing service, according to an embodiment of the invention.

Referring now to FIG. 6, which illustrates an operational scenario for a consumer marketing service 600 implemented in accordance with an embodiment of the invention. In the illustrated embodiment, business entities 602 are clients or customers of the consumer marketing service 600. In particular, the consumer marketing service 600 collects and analyzes information from multiple consumer accounts maintained by the business entities 602, and the consumer marketing service 600 then exploits this information to coordinate a targeted marketing campaign on behalf of the business entities 602. The consumer marketing service 600 operates in conjunction with other entities, including advertisers 604, delivery channels 606, third party data service providers 610, and consumer entities 608.

Referring to FIG. 6, the consumer marketing service 600 collects and processes contact information and other related consumer account information maintained by the business entities 602. Processing of this information can involve: (1) correlating the consumer entities 608 with respective consumer account identifiers or other aliases assigned by the business entities 602, such as frequent shopper numbers, discount shopper numbers, financial account numbers, telephone numbers, or e-mail addresses; (2) maintaining contact information for the consumer entities 608; (3) identifying previously attempted or preferred methods, types, or ways of contacting the consumer entities 608, such as based on preferences specified by the business entities 602 or based on opt-in/opt-out requests specified by the consumer entities 608; (4) deriving combined contact information for the consumer entities 608; (5) correlating the contact information with respective sources of the contact information from among the business entities 602, thereby allowing source attribution and revenue sharing among the business entities 602; (6) assigning consumer identifiers to the consumer entities 608 in a standardized format and notifying the business entities 602 about the assigned consumer identifiers; and (7) identifying updates to the contact information and other related information and notifying appropriate ones of the business entities 602 about the updates.

In addition, the consumer marketing service 600 collects and processes purchasing information and other related consumer account information maintained by the business entities 602. Processing of this information can involve: (1) tracking purchases and other shopping events involving the consumer entities 608, such as based on store visit event records in which no actual purchases are made or in which purchasing information is not available; "basket"-level purchase records including purchase amounts, payment identifiers, and audit trail data; product-level purchase records; and cash purchase records; (2) notifying the business entities 602 about which products are relevant for the marketing campaign, thereby allowing collection and processing of records involving those products; (3) deriving consumer profiles for the consumer entities 608; and (4) correlating information related to purchases and other shopping events with respective sources of the information from among the business entities 602, thereby allowing source attribution and revenue sharing among the business entities 602.

Still referring to FIG. 6, the consumer marketing service 600 next coordinates the marketing campaign on behalf of the business entities 602. Coordination of the marketing campaign can involve: (1) identifying criteria for the marketing campaign as specified by one or more of the advertisers 604, such as a start date and a stop date, products relevant for the marketing campaign, individual targeted promotions to be carried out within the marketing campaign, delivery channels to be used for each promotion, products relevant for each promotion, consumer selection criteria for inclusion or exclusion in each consumer segment to be targeted by a promotion, a rank or priority order for populating consumer segments, and any relevant financial metrics; (2) selecting contact information, purchasing information, and other related information of the consumer entities 608 in accordance with the specified criteria; (3) performing market analysis and segmentation analysis on the selected information to determine which ones of the consumer entities 608 should be included or excluded from the marketing campaign, such as by matching consumer profiles with products relevant for the marketing campaign; (4) performing market analysis and segmentation analysis on the selected information to determine which ones of the consumer entities 608 should be included or excluded from a promotion within the marketing campaign, such as by matching consumer profiles with products relevant for the promotion; (5) based on the market analysis and segmentation analysis, populating appropriate ones of the consumer entities 608 into various consumer segments in accordance with priority orders of the consumer segments; (6) deriving contact lists for the populated consumer segments, such that each contact list indicates appropriate ones of the consumer entities 608 to be targeted for a promotion and their contact information; (7) delivering the contact lists and promotional message information to the delivery channels 606 (e.g., cable TV, internet, and/or other electronic delivery mechanisms), which, in turn, delivers appropriate promotional messages to appropriate ones of the consumer entities 608 in accordance with the contact lists and promotional message information; (8) coordinating the delivery of promotional messages in accordance with the specified criteria for the marketing campaign and in accordance with other relevant criteria, such as to ensure that the promotional messages are delivered via preferred methods of contacting the consumer entities 608; (9) coordinating the delivery of follow-up promotional messages, such as those that are triggered by particular events or patterns or those specified for "serial" promotions; (10) tracking results and effectiveness of the marketing campaign, such as by tracking the delivery of promotional messages, identifying any favorable or unfavorable responses to the promotional messages, determining whether any shopping events can be attributed or deemed causally related to the promotional messages, and accounting for any special events that can impact a causal relationship between the promotional messages and shopping events; (11) reporting the results of the marketing campaign to the business entities 602 and the advertisers 604; and (12) performing other campaign management functions, such as defining control consumer groups and test consumer groups.

The delivery channels 606 (and 906 with reference to FIG. 9 below) can be any one or more of various media delivery channels by which promotional messages are delivered to consumer entities. Such a channel can include any one or more of a variety of electronic media such as the internet and a TV service network. (e.g., a cable TV network or a satellite TV network). For example, a message can be sent electronically to an identified consumer entity by email if an email address is part of that consumer entity's known or determined contact information. A message can be sent electronically to an identified consumer entity as a portion of a web page visited by that entity, much as an advertisement is presented as someone browses web pages on the World Wide Web, but with the invention the message is sent specifically to only particular client-side browsers when a server-side application recognizes a consumer entity based on login detail(s) provided by that entity (for example, name, email address, and/or some other type of specific information provided by the entity) and/or detects a cookie on the client computer that identifies the consumer entity (by, for example, name, email address, and/or some other type of specific information within the consumer entity's known or determined contact information). Once the entity is identified (by, for example, a cookie), the server-side application can cause the message to be served to the client browser such that the message appears as desired on the client computer for viewing by the consumer entity using that client computer. A message can be sent electronically to an identified consumer entity over a TV service's network (such as a subscription cable TV service's network and/or a subscription satellite TV service's network) to the identified entity's TV, and usually this is accomplished by the TV service sending the message over its network to one or more specific in-home set-top boxes and/or other device(s) connected to or part of the identified entity's TV. The TV service would have to be provided with sufficient identifying information about the specific consumer entity to be contacted such as the entity's phone number, full name, and/or some other type of specific information within the consumer entity's known or determined contact information. A message can be sent electronically to an identified consumer entity as a cell phone text message if a cell phone number is part of that consumer entity's known or determined contact information. Email, web, TV, and cell phone are just some of the electronic delivery channels by which messages can be targeted to identified consumer entities.

Referring back to FIG. 2, the seventh processing operation is to analyze the purchase records from the consumer entity and correlate them to the advertising campaigns targeted for that consumer entity (block 212). In one disclosed embodiment, once an advertisement is sent to a consumer entity, a subsequent purchase behavior analysis module (e.g., the subsequent purchase behavior analysis module 137) tracks the purchases of the consumer entity to measure the effectiveness of an advertisement or marketing campaign. Analysis of the purchase records may involve tracking which advertisements are sent to a consumer entity and checking whether subsequent purchases by the consumer entity are for any the products that are the focus of the advertisements. As discussed above, tracking whether a consumer entity responds to an advertisement has advantages for those business entities supplying contact information and those entities advertising through the disclosed system (such as the system 100 of FIG. 1).

Referring back to FIG. 5, the arrangement of combined contact information that is derived from multiple consumer accounts is obtained from multiple business entities, according to an embodiment of the invention. The consumer accounts maintained by business entity A, business entity B, and business entity C are associated with one common household, and the contact information from those accounts are aggregated to derive the combined contact information for the household, which is arranged as row 500. When the consumer entity is targeted with a message or selected for profiling and segmentation either in association with targeting a message or otherwise, a portion of the revenue derived from using the disclosed system can be split between Business Entity A, Business Entity B, and Business Entity C (i.e., the business entities that provided contact information for that consumer entity) according to the relative amount of contact information provided by each entity. For example, row 302 illustrates that Business Entity B provided three pieces of contact information associated with the consumer entity. Further, row 500 illustrates that there are a total of eight pieces of contact information associated with the consumer entity. Because Business Entity B provides three out of the eight pieces of information, then Business Entity B can be given 37.5% (i.e., three-eighths) of the revenue derived from sending the advertisement to that consumer entity. A similar calculation may be carried out to apportion revenue associated with the use of purchase information in targeting or segmentation or profiling. This gives the providers of contact information and purchase information an additional source of revenue.

Figure 8:
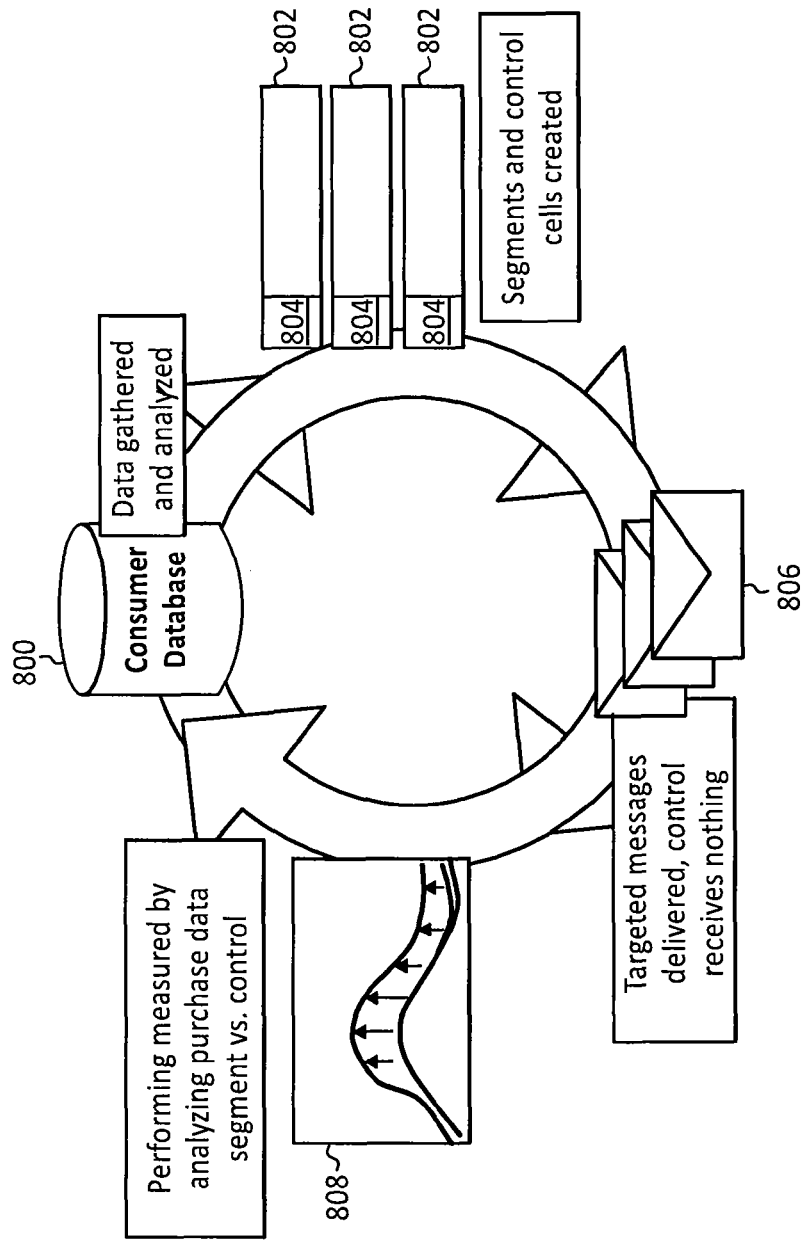
FIG. 8 relates to determining the effectiveness of a targeted marketing message, according to an embodiment of the invention.

Referring now to FIG. 8, the effectiveness of a marketing campaign may be determined by gathering consumer contact and purchase information into a consumer database 800 and using the purchase information to create consumer segments 802. From among these segments, control groups 804 may be created. Targeted messages 806 then can be sent to those consumer entities identified in the consumer segments 802. Exemplary embodiments for collecting consumer information, creating consumer segments, and sending targeting messages are explained in the above description that references FIG. 6. To determine the effectiveness of a marketing campaign, the targeted messages 806 are not sent to the consumer entities in the control group. Although messages are not sent to consumer entities within the control group, these entities are still among those identified for consumer segments 802. That is, the control group consists of consumer entities identified as potential targets of the subject marketing campaign. Creating control groups allows subsequent purchase behavior of consumer entities receiving an advertisement to be compared to the purchase behavior of entities not receiving the advertisement (at 808). As a result, subsequent purchase behavior may be analyzed to determine the effectiveness of a particular marketing campaign.

In one embodiment, subsequent purchase behavior may be analyzed by comparing the purchase records of those consumer entities from the control group against the purchase records of those consumer entities outside the control group but in the identified consumer segment. In this embodiment, after sending a targeted advertising message (in accordance with, for example, any of the above-described targeted messaging systems and techniques), the subsequent purchase records of the consumer entities receiving the advertising message are aggregated. Next, the consumer entities with purchase records that correspond to the advertised item or service (such as one or more products) in the message (that is, the consumer entities that responded to the targeted message) are selected from the aggregate purchase records. The number of consumer entities that are selected are then divided by the total number of consumer entities that received the advertising message. This allows an advertiser to gauge the response rate relative to a particular message of a marketing campaign. The percentage of consumer entities from the control group that bought the advertised product or products can be calculated, and this calculation can be performed in the same manner as the calculation for the response rate of consumer entities that receive the advertising message. The two calculated percentages can then be compared to measure the effectiveness of the advertising message. That is, if the percentage of consumer entities that respond to the advertising message is much greater than the percentage of consumer entities from the control group that buy the advertised product, then the advertiser has an objective measure, and thus a degree of confidence, that the targeted advertisement was effective and thus was sent to an appropriate consumer segment.

Referring back to FIG. 5, the arrangement of combined contact information that is derived from multiple consumer accounts is obtained from multiple business entities, according to an embodiment of the invention. The consumer accounts maintained by business entity A, business entity B, and business entity C are associated with one common household, and the contact information from those accounts are aggregated to derive the combined contact information for the household, which is arranged as row 500. When the consumer entity is part of a group which has been sent targeted messages using the disclosed system, a portion of the revenue derived from using the system to measure the effectiveness of the targeted messaging can be split between Business Entity A, Business Entity B, and Business Entity C (i.e., the business entities that provided contact information for that consumer entity) according to the relative amount of contact information provided by each entity. For example, row 302 illustrates that Business Entity B provided three pieces of contact information associated with the consumer entity. Further, row 500 illustrates that there are a total of eight pieces of contact information associated with the consumer entity. Because Business Entity B provides three out of the eight pieces of information, then Business Entity B can be given 37.5% (i.e., three-eighths) of the revenue derived from sending the advertisement to that consumer entity. A similar calculation may be carried out to apportion revenue associated with the use of purchase information in measuring the effectiveness of the targeted messaging. This gives the providers of contact information and purchase information an additional source of revenue.

Figure 9:
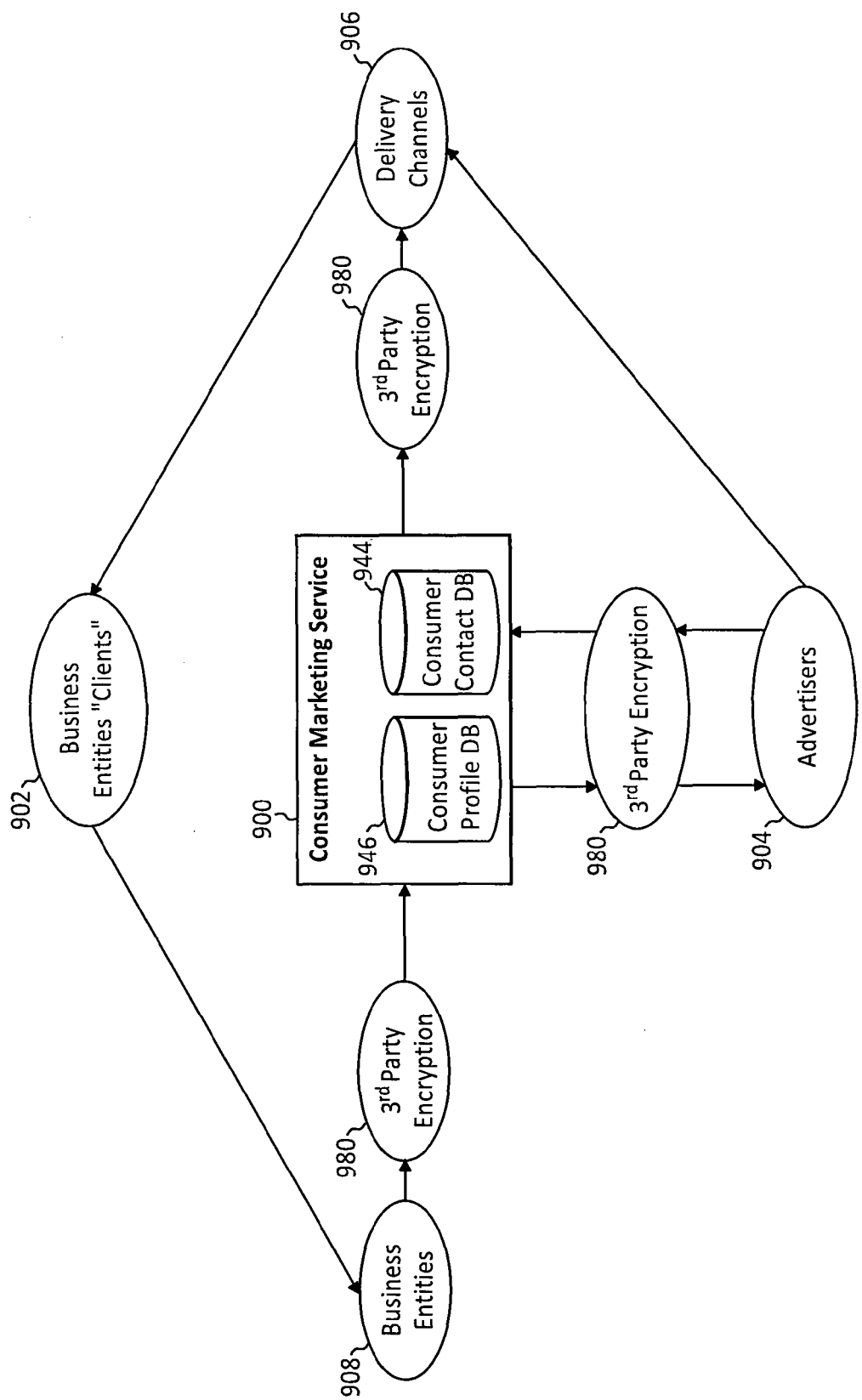
FIG. 9 is an operational flow diagram for a consumer marketing service, according to an embodiment of the invention.

FIG. 9 is an operational flow diagram for a consumer marketing service 900, according to an embodiment of the invention. One or more entities can perform one or more steps of the method. In the illustrated embodiment, the entities involved include the business entity clients 902 (which are the consumers), business entities 908, a consumer marketing service 900, advertisers 904, and delivery channels 906, all similar to those shown in FIG. 6 and described with respect thereto. The consumer marketing service 900 can include a consumer purchase profile database 946 and a consumer contact information database 944. The consumer profile database 946 includes item data, purchase data, etc. The consumer contact database 944 includes contact data of the consumers, identifier data of the consumers, etc. The identifier data assigned to a specific consumer can include an identifier assigned by the consumer marketing service 900 (or 600), an advertiser consumer identifier, a delivery channel consumer identifier, message identifiers for the consumer, etc.

In this embodiment, at least a portion of data transmitted between the consumer marketing service 900 and any of the business entities 908, the advertisers 904, and the delivery channels 906 is encrypted via a $3^{rd}$ party encryption 980. In one embodiment, the data is encrypted remotely as indicated by block 980. In an alternative embodiment, the data is encrypted locally at one or more of the business entities 908, the consumer marketing service 900, the advertisers 904, and/or the delivery channels 906 via the $3^{rd}$ party encryption 980 or other encryption. The encryption can be accomplished by one or more software programs. The $3^{rd}$ party encryption 980 can encrypt via public key infrastructure with, for example, an asymmetric private/public key pair. It should be understood that the $3^{rd}$ party encryption 980 can encrypt via any suitable means, including for example, public-key cryptography, digital certificates, and/or secure file transfer protocols.

Each of the business entities 908 collect purchase data, item data, payment card data, store card data, and typically at least some contact data of their customers as a result of those customers completing goods/services transactions at the business entities (and using in conjunction with those transactions store cards such as loyalty program cards). At least some of the data (e.g., the payment card and contact data) is encrypted via the $3^{rd}$ party encryption 980 and transmitted to the consumer marketing service 900 along with transaction locations and timing.

The consumer marketing service 900 can produce/create and maintain a list of the clients 902 with their respective consumer identifier, contact data, and purchase data from each business entity 908. The consumer marketing service 900 can segment that data and store the data in its consumer profile database and the consumer contact database. The consumer marketing service 900 can communicate with the advertisers 904 (via the $3^{rd}$ party encryption 980 as necessary) to match consumer marketing service consumer identifiers with advertiser consumer identifiers when available. The advertisers 904 can specify the nature of segmented ads/offers and receive that corresponding segmented data from the consumer marketing service 900. The consumer marketing service 900 can receive a list of consumer marketing service identifiers matched with their respective targeted message identifiers from the advertisers 904.

The consumer marketing service 900 can communicate with the delivery channels 906 via the $3^{rd}$ party encryption 980 in order to match its consumer marketing service consumer identifier with the delivery channel consumer identifier and message identifiers. The matched data is sent from the consumer marketing service 900 to the delivery channels 906. The advertisers 904 can also transmit the message identifiers with the precise definition and design of each message to the delivery channels 906. The delivery channels 906 can match the consumers 902 and the targeted messages based on the message identifiers. The consumers 902 can receive targeted and relevant marketing messages from the delivery channels 906.

Figure 7:
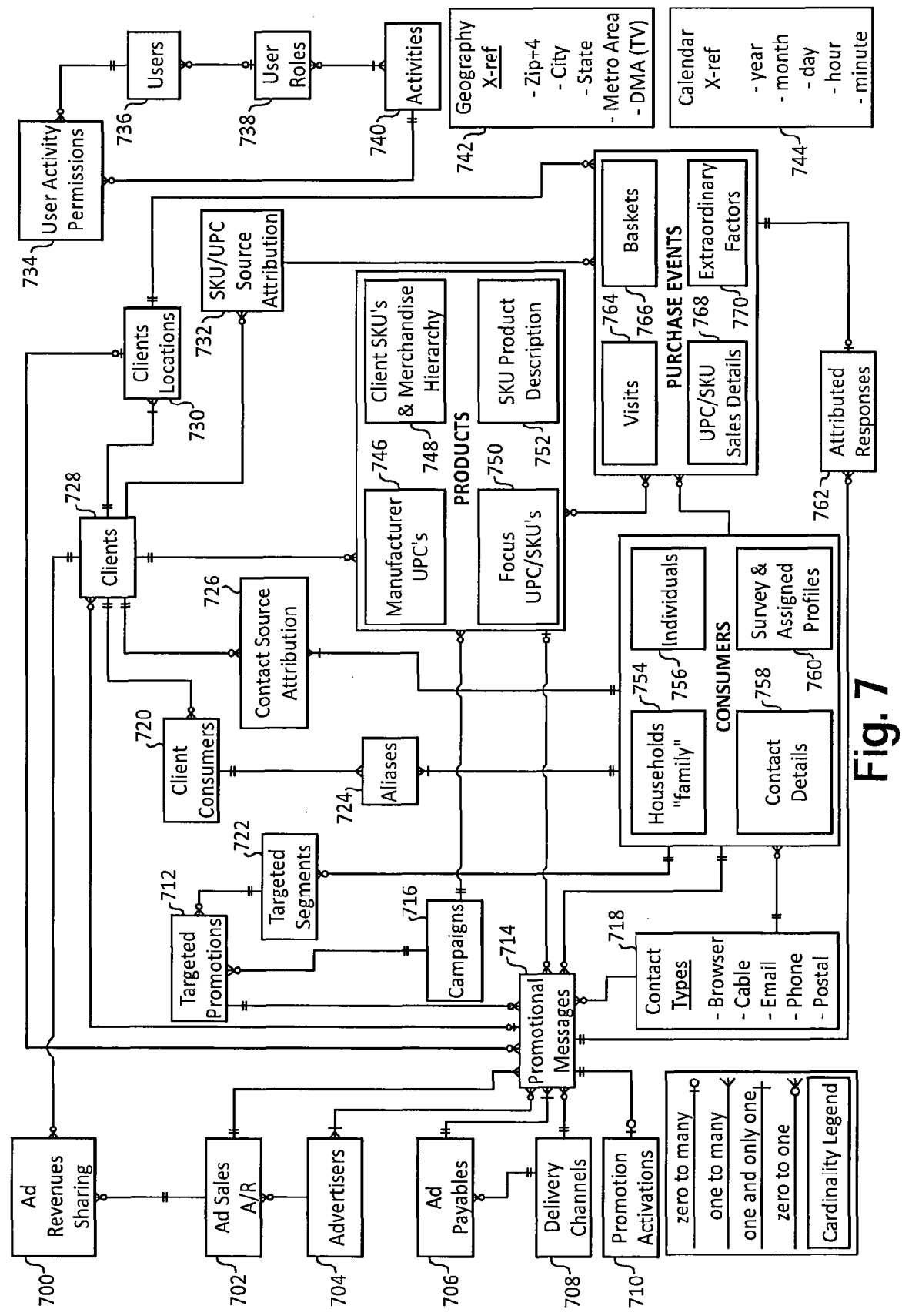
FIG. 7 is an arrangement of information related to operation of a consumer marketing service, according to an embodiment of the invention.

Certain advantages and features may be more fully appreciated in connection with FIG. 7, which illustrates various interrelated data entities implemented in accordance with an embodiment of the invention. In the illustrated embodiment of FIG. 7, a consumer marketing service (e.g., the consumer marketing service 600 or 900) maintains these data entities in connection with the design and execution of targeted marketing campaigns. The following discussion provides examples of data elements included within these data entities.

Activities (block 740)—this data entity is a record of possible activities that a user can perform, such as retrieve and review a record, create a new record, update an existing record, mark a record inactive, or flag a record for deletion. This data entity can include a granular list of every possible activity by each user. Examples include:
  Activity Identification ("ID")
  Activity description
  Creation date and time stamp
  Created by user ID
  Last update date and time stamp
  Updated by user ID Ad Payables (block 706)—this data entity is a record of the accrued or incurred payables related to a batch of promotional messages delivered via particular delivery channels. Examples include:
  Advertising payables ID
  Media channel ID
  Promotional messages ID
  Creation date and time stamp
  Created by user ID
  Last update date and time stamp
  Updated by user ID
  Other attributes Ad Revenues Sharing (block 700)—this data entity is a record of the advertising revenue split attributed to a client based on some combination of sourcing consumers and purchase records. Examples include:
  Advertising revenues ID
  Creation date and time stamp
  Created by user ID
  Last update date and time stamp
  Updated by user ID
  Other attributes Ad Sales A/R (block 702)—this data entity is a record of the charges to an advertiser for the delivery of promotional messages via one or more delivery channels. Examples include:
  Advertising sales record ID
  Creation date and time stamp
  Created by user ID
  Last update date and time stamp
  Updated by user ID
  Other attributes Advertisers (block 704)—this data entity is a record of relevant information about advertisers on behalf of which the consumer marketing service coordinates the delivery of targeted promotional messages. An advertiser can also be a client that provides consumer contact information and shopping event information. Examples include:
  Advertiser ID
  Business name
  Account representative name
  Full address information
  Full telephone contact information
  Full electronic contact information
  Various billing parameters, discount level, payments terms, and so forth
  Creation date and time stamp
  Created by user ID
  Last update date and time stamp
  Updated by user ID
  Other attributes Aliases (block 724)—this data entity includes a table that cross-references a client consumer ID (e.g., a consumer account identifier), which is assigned to a consumer by a client, with a unique Data Logix ID, which is assigned to the same consumer by the consumer marketing service. Examples include:
  Client ID
  Client consumer ID
  Shopper ID
  Data Logix ID
  Creation date and time stamp
  Created by user ID
  Last update date and time stamp
  Updated by user ID
  Other attributes Attributed Responses (block 762)—this data entity is a "retroactively constructed" transaction record, which is derived in a periodic manner to: (1) correlate promotional messages delivered during a time period with shopping events during a similar time period; and (2) attribute a causal relationship when a reasonable connection exists. Examples include:
  Shopping event ID
  Promotional message ID
  Quantity metric
  Value metric
  Timeliness metric
  Creation date and time stamp
  Created by user ID
  Last update date and time stamp
  Updated by user ID
  Other attributes Calendar X-ref (block 744)—this data entity includes a series of tables that indicate valid dates and times.

Campaigns (block 716)—this data entity is a record of attributes and criteria specified for a marketing initiative, such as a marketing campaign. Examples include:
- Campaign prime-ID
- Campaign sub-ID
- Short name
- Longer description
- Start date
- End date
- Scope metrics
  - Number of targeted promotions
  - Number of shoppers
  - Number of products
  - Number of delivery channels
  - Number of promotional messages
- Financial metrics
  - Planned spending
  - Planned revenue
  - Projected Return on Investment ("ROI")
  - Actual spending
  - Actual revenue/benefit
  - Realized ROI
- Creation date and time stamp
- Created by user ID
- Last update date and time stamp
- Updated by user ID
- Other attributes Client Consumers (block 720)—this data entity is a historical record of consumer information provided by clients to the consumer marketing service. Examples include:
- Client ID
- Client consumer ID
- Consumer name
- Consumer contact information
  - Postal address
  - Telephone number
  - E-mail address
- Consumer opt-in status by delivery channel
- Any geo-demographic data about consumer
- Consumer profile attributes
- Date of consumer acquisition by client
- Creation date and time stamp
- Created by user ID
- Last update date and time stamp
- Updated by user ID
- Other attributes Client Locations (block 730)—this data entity includes information about a client's retail locations from which the consumer marketing service receives shopping event information. In a retail sense, a location can be a particular store location, a point-of-sale ("POS") device within that store location, or a department/section within that store location. For example, a retail pharmacy can designate a back-end pharmacy, a front-end merchandise section, and a photofinishing section as separate locations. Examples include:
- Location ID
- Client ID
- Client Location Number
- Client Location Short Name
- Geography X-ref attributes, including zip code+4, city, state, metro area codes, and Designated Marketing Area ("DMA") codes
- Hours of operation per day
- Days of operation per week
- Square footage or retail space
- Location type (e.g., rural, suburban, or urban)
- Other attributes to differentiate locations when targeting consumers
- Creation date and time stamp
- Created by user ID
- Last update date and time stamp
- Updated by user ID
- Other attributes Clients (block 728)—This data entity includes relevant information about clients on behalf of which the consumer marketing service performs targeted consumer marketing. This data entity is implemented to accommodate a client having multiple divisions, regions, districts, areas, and banners. Examples include:
- Client ID
- Business name and contact information, such as full address information, suite number, street, city, state, zip code, and headquarters telephone numbers
- Client executive contact's name and contact information, such as desk, facsimile, and mobile telephone numbers; and full electronic contact information, such as e-mail address, instant messaging identity, and social network addresses
- Various financial attributes
- Contractual status
- Start and end dates of formal relationship
- Creation date and time stamp
- Created by user ID
- Last update date and time stamp
- Updated by user ID
- Other attributes Contact Source Attribution (block 726)—this data entity is a record of which clients have sourced consumer contact information. In the event that a particular item of information is sourced by multiple clients, appropriate credit (out of 100% credit) for the item of information can be attributed among those clients. Examples include:
- Contact source attribution ID
- Client ID
- Shopper ID
- Creation date and time stamp
- Created by user ID
- Last update date and time stamp
- Updated by user ID
- Other attributes Contact Types (block 718)—this data entity is a record of specified types of contact for promotional messages. Examples include:
- Contact Type Code
- Postal address
- Direct mail
- Cable television
- E-mail (e.g., business and personal)
- Telephone (e.g., work, home, and mobile)
- Web browser
- Cookie
- Internet Service Provider user ID
- Contact Type Description
- Creation date and time stamp
- Created by user ID
- Last update date and time stamp
- Updated by user ID
- Other attributes Delivery Channels (block 708)—this data entity includes relevant information about various media delivery channels by which promotional messages are delivered to consumers. Examples include:
- Delivery Channel ID
- Delivery Channel name
- Delivery Channel contact information
- Contractual terms and conditions Attributes related to how to package and route promotional messages scheduled for delivery
Creation date and time stamp
Created by user ID
Last update date and time stamp
Updated by user ID
Other attributes Geography X-ref (block 742)—this data entity includes a table that cross-references data for geographic designations. This data entity can also be used for validation purposes, such as a list of valid city/town names, state names, metro area codes, and DMA codes. Examples include:
  Unique geography ID assigned by consumer marketing service
  Zip code basic
  Zip code plus 4
  City name
  State name
  Metro area code
  DMA code
  Creation date and time stamp
  Created by user ID
  Last update date and time stamp
  Updated by user ID Products—Client SKU's & Merchandise Hierarchy (block 748)—this data entity includes a set of tables that include client-specific information about products. In many cases, a client will assign its own unique Stock Keeping Unit ("SKU") designation to a product, which can also have an assigned Universal Product Code ("UPC"). In some cases, a SKU can be related to one or more UPC's. This data entity can also expose a client's own merchandise reporting hierarchy, such that the consumer marketing service can provide analysis and reporting functions based on the hierarchy used by the client. Examples include:
  Client SKU ID
  Manufacturer UPC if available (one or multiple)
  Client's merchandise hierarchy codes
  Department
  Category
  Class
  Creation date and time stamp
  Created by user ID
  Last update date and time stamp
  Updated by user ID
  Other attributes Products—Focus UPC/SKU's (block 750)—this data entity is a record of particular UPC's and Client SKU's for which the consumer marketing service will perform targeted marketing and tracking functions. Examples include:
  Focus ID
  UPC
  Client ID
  Client SKU
  Campaign ID
  Start Date
  End Date
  Creation date and time stamp
  Created by user ID
  Last update date and time stamp
  Updated by user ID
  Other attributes Products—Manufacturer UPC's (block 746)—this data entity is a record of industry standard information about products. Examples include:
  UPC ID
  Start Signal
  Manufacturer ID
  Product ID
  Check digit
  UPC type (e.g., 14 digit EAN/UCC number, 12 digit format, or 11 digit format)
  Effective Date
  Status code, including planned, active, or retired
  Manufacturer Name
  Product Name
  Selling unit of measure
  Units in selling package
  Weight value
  Unit of weight measure
  Description, size, color, and weight
  Published retail list price (if any)
  Published margin percent (if any)
  Creation date and time stamp
  Created by user ID
  Last update date and time stamp
  Updated by user ID
  Other attributes Products—SKU Product Description (block 752)—this data entity is a record of clients' SKU information for products that do not have UPC's. This data entity can also include overriding information in those cases where a single SKU can be related to one or more UPC's. Examples include:
  Client SKU ID
  Effective Date
  Status code, including planned, active, or retired
  Manufacturer Name
  Product Name
  Selling unit of measure
  Units in selling package
  Weight value
  Unit of weight measure
  Description, size, color, and weight
  Published retail list price (if any)
  Published margin percent (if any)
  Creation date and time stamp
  Created by user ID
  Last update date and time stamp
  Updated by user ID
  Other attributes Promotional Activations (block 710)—this data entity is a record of instances where consumers have signaled the visibility of or interest in participating in a promotion. Examples include:
  Shopper Activation ID
  Promotional message ID
  Creation date and time stamp
  Created by user ID
  Last update date and time stamp
  Updated by user ID
  Other attributes Promotional Messages (block 714)—this data entity includes information about promotional messages. Examples include:
  Promotional message ID
  Activation Status Code (yes or no)
  Delivery Channel ID
  Advertiser ID
  Client ID
  Location ID
  Targeted Promotion ID
  Product ID
  Shopper ID
  Creation date and time stamp Created by user ID
Last update date and time stamp
Updated by user ID
Other attributes Consumers—Survey & Assigned Profiles (block 760)—this data entity includes consumer profiles and survey information for households and individuals. Survey information can be collected when, for example, e-mail recipients respond to questions. Profiling can involve the assignment of recency, frequency, and monetary scores to a household or an individual. Examples include:
  Shopper ID
  Shopper type (e.g., head of household or individual)
  Profile attribute ID
  Recency percentile
  Frequency percentile
  Monetary percentile
  Age category
  Gender classification
  Income level
  Education level
  Creation date and time stamp
  Created by user ID
  Last update date and time stamp
  Updated by user ID
  Other attributes Consumers—Contact Details (block 758)—this data entity is scalable and serves to store and make available contact information for each household or any individual within the household. This data entity allows for storage and maintenance of contact types via various delivery channels, such as postal address, e-mail address, voice and facsimile telephone numbers, and cookie identifiers. Examples include:
  Contact detail ID
  Individual ID
  Household ID (same as Individual ID if contact detail is for a household)
  Contact type
  Contact types subdivided as appropriate
    Telephone area code, local branch exchange, outside direct dial number, and internal extension number
    E-mail user name (prefix and suffix), sub-domain name, domain name, and generic top level domain
    Postal address, unit number, location line 1, location line 2, city, state, and zip+4
    Others, such as instant message identity and social network identity
  Creation date and time stamp
  Created by user ID
  Last update date and time stamp
  Updated by user ID
  Other attributes Consumers—Households (block 754)—this data entity includes a name and other relevant information for a household. A household can include all individuals living at a single postal address, and can include at least one individual correlated with at least one contact detail. A household can include more than one individual if those individuals share the same postal address. Examples include:
  Household ID
  Household family name
  Individual ID (the primary)
  Contact Details ID (the primary)
  Geo-demographic attributes about the household, such as:
    Family size
    Presence of children
    Income level
    Education level
    Home value
    Owner/renter
    Professional/blue collar
  Creation date and time stamp
  Created by user ID
  Last update date and time stamp
  Updated by user ID
  Other attributes Consumers—Individuals (block 756)—this data entity includes a name and geo-demographic information for an individual. An individual can be a member of a single household. A household can include more than one individual if those individuals share the same postal address. Examples include:
  Individual ID
  Household ID (same as Individual ID if individual is head of household)
  Title
  First name
  Middle initial
  Last name
  Suffix
  Birth date
  Marital status
  Number of children
  Gender
  Income level
  Education level
  Other geo-demographic attributes
  Creation date and time stamp
  Created by user ID
  Last update date and time stamp
  Updated by user ID
  Other attributes Purchase Events—Baskets (block 766)—this data entity is a record of purchasing information related to "baskets," which are a form of shopping event. When consumers visit a client location and transact, summary level information about a "basket" (and possibly UPC/SKU level purchasing details) can be collected. Examples include:
  Shopper ID
  Client ID
  Location ID
  POS identity (e.g., register number and employee number)
  Client's POS transaction ID (e.g., transaction log number)
  Regular retail sales amount
  Promotional or discounted sales amount
  Tax amount
  Total spent amount
  Primary method of payment
  Secondary method of payment
  Client provided shopping visit date and time stamp
  Creation date and time stamp
  Created by user ID
  Last update date and time stamp
  Updated by user ID
  Other attributes Purchase Events—Extraordinary Factors (block 770)—this data entity includes a set of tables that store information about unusual or special events, such as special sales events, vagaries in store operating dates and hours, product shortages, new product introductions, and price changes. Examples include:
  Extraordinary Factor ID
  Descriptions
  Pertinent start and end dates Type of extraordinary factor
Creation date and time stamp
Created by user ID
Last update date and time stamp
Updated by user ID
Other attributes Purchase Events—UPC/SKU Sales Details (block 768)—this data entity is a record of purchasing information in the form of UPC/SKU level purchasing details. Examples include:
Sales Detail ID
Shopper ID
Manufacturer UPC
Client SKU ID
Location ID
Quantity
Unit Price
Extended retail price
Discount amount
Net sales amount
Profit margin metric
Client's POS transaction ID (e.g., transaction log number)
Creation date and time stamp
Created by user ID
Last update date and time stamp
Updated by user ID
Other attributes Purchase Events—Visits (block 764)—this data entity is a record of information related to visits, which are another form of shopping event. In particular, when consumers visit a client location without transacting, certain information can be collected. Examples include:
Shopper ID
Client ID
Location ID
Client provided shopping visit date and time stamp
Creation date and time stamp
Created by user ID
Last update date and time stamp
Updated by user ID
Other attributes Targeted Promotions (block 712)—this data entity is a record of a batch of promotional messages to be delivered. Examples include:
Targeted Promotion ID
Campaign ID
Targeted Segment ID
Promotion name
Promotion description
Promotion planned start date
Promotion actual data
Planned scope metrics
Actual scope metrics
Forecasted ROI metrics
Actual ROI metrics
Creation date and time stamp
Created by user ID
Last update date and time stamp
Updated by user ID
Other attributes Targeted Segments (block 722)—this data entity includes a list of consumers identified as included in a particular consumer segment. Examples include:
Targeted Segment ID
Segment name and description
Segment status (e.g., planned, active, or retired)
Segment type (e.g., one time or reusable)
Shopper ID
Creation date and time stamp
Created by user ID
Last update date and time stamp
Updated by user ID
Other attributes SKU/UPC Source Attribution (block 732)—this data entity is a record of which clients have sourced purchasing information and other shopping event information. A particular SKU level purchasing detail is typically collected from a single client, but multiple clients can provide other shopping event information. In the event that a particular item of information is sourced by multiple clients, appropriate credit (out of 100% credit) for the item of information can be attributed among those clients. Examples include:
SKU/UPC source attribution ID
Client ID
Shopping Event ID
Creation date and time stamp
Created by user ID
Last update date and time stamp
Updated by user ID
Other attributes User Activity Permissions (block 734)—this data entity is a record of permitted activities that a user can perform. Examples include:
User Activity Permission ID
User ID
Activity ID
Creation date and time stamp
Created by user ID
Last update date and time stamp
Updated by user ID
Other attributes User Roles (block 738)—this data entity is a record of activities that a user in a particular role is expected to perform. Examples include:
User Role ID
Activity ID
Creation date and time stamp
Created by user ID
Last update date and time stamp
Updated by user ID
Other attributes Users (block 736)—this data entity includes a list of user names and assigned roles. Examples include:
User ID
User Role ID
User name and various human resources information for auditing purposes
Creation date and time stamp
Created by user ID
Last update date and time stamp
Updated by user ID
Other attributes Certain disclosed embodiments relate to and/or include computer storage. The storage can be in the form of one or more computer-readable mediums having data and/or executable instructions (also called computer programs, code, or software) stored thereon or therein. The software is for performing various computer-implemented processing operations such as any or all of the various operations, functions, and capabilities described hereinabove. The term "computer-readable medium" is used herein to include any medium capable of storing data and/or storing or encoding a sequence of executable instructions or computer code for performing the processing operations described hereinabove. The media and computer code can be those specially designed and constructed for the purposes of the invention, or can be of the kind well known and available to those having ordinary skill in the computer and/or software arts. Examples of computer-readable media include computer-readable storage media such as: magnetic media such as fixed disks, floppy disks, and magnetic tape; optical media such as Compact Disc-Read Only Memories ("CD-ROMs") and holographic devices; magneto-optical media such as floptical disks; memory sticks "flash drives" and hardware devices that are specially configured to store and execute program code, such as Application-Specific Integrated Circuits ("ASICs"), Programmable Logic Devices ("PLDs"), Read Only Memory ("ROM") devices, and Random Access Memory ("RAM") devices. Examples of computer code include machine code, such as produced by a compiler, and files containing higher level code that are executed by a computer using an interpreter. For example, an embodiment of the invention may be implemented using Java, C++, or other programming language and development tools. Additional examples of computer code include encrypted code and compressed code. Other embodiments of the invention can be implemented in hardwired circuitry in place of, or in combination with, computer code.

Various embodiments of the invention have been described. These are examples and are not limiting on the invention. Also, combinations of various disclosed embodiments, features, elements, and functionality are possible and within the scope of this disclosure even if not expressly described as being used in combination or in conjunction with each other.

What is claimed is:

1. A non-transitory processor-readable medium storing code representing instructions that when executed cause a processor to:
   receive a first purchase record associated with a first individual;
   receive a second purchase record associated with a second individual different than the first individual;
   receive contact information that is derived at least in part on information not included in the first purchase record or the second purchase record and associated with both the first individual and the second individual;
   analyze the first purchase record and the second purchase record to associate consumer accounts identified in the first purchase record and the second purchase record with a single consumer entity;
   aggregate the received contact information to derive combined contact information for the consumer entity;
   define a consumer profile associated with consumer entity, the consumer entity including the first individual and the second individual, the consumer profile being based at least in part on the first purchase record, the second purchase record, and the combined contact information for the consumer entity;
   determine that at least a portion of the consumer profile conforms to a set of one or more target criteria; and
   send a marketing message directed to at least one of the first individual or the second individual.

2. The non-transitory processor-readable medium of claim 1, wherein the marketing message is at least one of:
   an electronic mail message;
   an SMS text message;
   a message sent to a mobile device;
   a message sent to a telephone;
   a television advertisement; or
   a postal message.

3. The non-transitory processor-readable medium of claim 1, wherein the marketing message includes an offer to the first individual to make a purchase at a discount.

4. The non-transitory processor-readable medium of claim 1, wherein the consumer profile is defined based at least in part on a consumer identification datum included in at least one of the first purchase record or the second purchase record.

5. The non-transitory processor-readable medium of claim 1, wherein the marketing message is a web-based advertisement, the web-based advertisement being sent based at least in part on a presence of a browser cookie associated with the first individual.

6. The non-transitory processor-readable medium of claim 1, wherein the first purchase record is received from at least one of:
   an offline retailer;
   an online retailer; or
   an offline and online retailer.

7. The non-transitory processor-readable medium of claim 1, wherein the first purchase record is associated with a loyalty card purchase.

8. The non-transitory processor-readable medium of claim 1, wherein the consumer entity comprises a household.

9. A system comprising:
   a processor; and
   a memory coupled with and readable by the processor and storing a set of instructions which, when executed by the processor, causes the processor to:
   receive a first purchase record associated with a first individual;
   receive a second purchase record associated with a second individual different than the first individual;
   receive contact information that is derived at least in part on information not included in the first purchase record or the second purchase record and associated with both the first individual and the second individual;
   analyze the first purchase record and the second purchase record to associate consumer accounts identified in the first purchase record and the second purchase record with a single consumer entity;
   aggregate the received contact information to derive combined contact information for the consumer entity;
   define a consumer profile associated with consumer entity, the consumer entity including the first individual and the second individual, the consumer profile being based at least in part on the first purchase record, the second purchase record, and the combined contact information for the consumer entity;
   determine that at least a portion of the consumer profile conforms to a set of one or more target criteria; and
   send a marketing message directed to at least one of the first individual or the second individual.

10. The system of claim 9, wherein the marketing message is at least one of:
    an electronic mail message;
    an SMS text message;
    a message sent to a mobile device;
    a message sent to a telephone;
    a television advertisement; or
    a postal message.

11. The system of claim 9, wherein the marketing message includes an offer to the first individual to make a purchase at a discount.

12. The system of claim 9, wherein the consumer profile is defined based at least in part on a consumer identification datum included in at least one of the first purchase record or the second purchase record.

13. The system of claim 9, wherein the marketing message is a web-based advertisement, the web-based advertisement being sent based at least in part on a presence of a browser cookie associated with the first individual.

14. The system of claim 9, wherein the first purchase record is received from at least one of:
- an offline retailer;
- an online retailer; or
- an offline and online retailer.

15. The system of claim 9, wherein the first purchase record is associated with a loyalty card purchase.

16. The system of claim 9, wherein the consumer entity comprises a household.

17. A method for targeting messages, the method comprising:
- receiving a first purchase record associated with a first individual;
- receiving a second purchase record associated with a second individual different than the first individual;
- receive contact information that is derived at least in part on information not included in the first purchase record or the second purchase record and associated with both the first individual and the second individual;
- analyzing the first purchase record and the second purchase record to associate consumer accounts identified in the first purchase record and the second purchase record with a single consumer entity;
- aggregating the received contact information to derive combined contact information for the consumer entity;
- defining a consumer profile associated with consumer entity, the consumer entity including the first individual and the second individual, the consumer profile being based at least in part on the first purchase record, the second purchase record, and the combined contact information for the consumer entity;
- determining that at least a portion of the consumer profile conforms to a set of one or more target criteria; and
- sending a marketing message directed to at least one of the first individual or the second individual.

18. The method of claim 17, wherein the marketing message is at least one of:
- an electronic mail message;
- an SMS text message;
- a message sent to a mobile device;
- a message sent to a telephone;
- a television advertisement; or
- a postal message.

19. The method of claim 17, wherein the marketing message includes an offer to the first individual to make a purchase at a discount.

20. The method of claim 17, wherein the consumer profile is defined based at least in part on a consumer identification datum included in at least one of the first purchase record or the second purchase record.

21. The method of claim 17, wherein the marketing message is a web-based advertisement, the web-based advertisement being sent based at least in part on a presence of a browser cookie associated with the first individual.

22. The method of claim 17, wherein the first purchase record is received from at least one of:
- an offline retailer;
- an online retailer; or
- an offline and online retailer.

23. The method of claim 17, wherein the first purchase record is associated with a loyalty card purchase.

24. The method of claim 17, wherein the consumer entity comprises a household.

* * * * *